United States Patent [19]

Hasegawa et al.

[11] Patent Number: 4,882,619
[45] Date of Patent: Nov. 21, 1989

[54] HIGH RESOLUTION IMAGE PICKUP SYSTEM WITH COLOR DISPERSION MEANS

[75] Inventors: Akira Hasegawa; Susumu Takahashi, both of Hachiouji; Kiyoshi Tsuji, Tanashi; Kimihiko Nishioka, Hachiouji; Hiroshi Matsui, Hino, all of Japan

[73] Assignee: Olympus Optical Co., Ltd., Tokyo, Japan

[21] Appl. No.: 35,013

[22] Filed: Apr. 6, 1987

[30] Foreign Application Priority Data

Apr. 7, 1986 [JP] Japan ................................. 61-79421
Apr. 25, 1986 [JP] Japan ................................. 61-96554

[51] Int. Cl.$^4$ ...................... H04N 9/077; A61B 1/06; G02B 1/24
[52] U.S. Cl. ........................................ 358/55; 358/98; 358/44; 128/6; 350/402
[58] Field of Search ...................... 358/44, 55, 41, 43, 358/98, 75, 228; 128/6; 350/401–404

[56] References Cited

U.S. PATENT DOCUMENTS

| | | | |
|---|---|---|---|
| 2,465,652 | 3/1949 | Legler | 358/55 |
| 2,560,351 | 7/1951 | Keil et al. | 358/55 X |
| 3,306,974 | 2/1967 | Cunnally | 358/75 |
| 3,497,283 | 2/1970 | Law | 358/55 X |
| 3,619,490 | 11/1971 | Usui | 358/44 |
| 3,751,133 | 8/1973 | Nishino | 358/44 X |
| 3,922,069 | 11/1975 | Kishikawa et al. | 358/55 X |
| 4,009,941 | 3/1977 | Verdijk et al. | 358/55 X |
| 4,198,123 | 4/1980 | Kremen | 350/401 |
| 4,575,193 | 3/1986 | Greivenkamp, Jr. | 350/401 |
| 4,605,956 | 8/1986 | Cok | 358/55 X |
| 4,626,897 | 12/1986 | Sato et al. | 358/55 X |
| 4,653,478 | 3/1987 | Nagasaki et al. | 128/6 |
| 4,654,698 | 3/1987 | Langworthy | 358/55 X |
| 4,697,208 | 9/1987 | Eino | 358/44 |

FOREIGN PATENT DOCUMENTS

| | | | |
|---|---|---|---|
| 52-55428 | 5/1977 | Japan | 358/98 |
| 54-154348 | 12/1979 | Japan | 358/75 |
| 55-30222 | 3/1980 | Japan | 358/55 |
| 55-124378 | 9/1980 | Japan | 358/55 |
| 56-40546 | 9/1981 | Japan | . |
| 58-182365 | 10/1983 | Japan | 358/75 |
| 1455365 | 11/1976 | United Kingdom | 358/55 |

Primary Examiner—Howard W. Britton
Assistant Examiner—Mark R. Powell
Attorney, Agent, or Firm—Cushman, Darby & Cushman

[57] ABSTRACT

In order to enhance resolving power and making the fabrication of an optical system easy, the image pickup device is of an arrangement that a color-separating optical means is disposed between an objective lens and a solid-state image sensor, and those images by the respective color lights which are focused at mutually displaced positions on the solid-state image sensor are integrated into one unified image by a signal processing circuitry to thereby collect also the image-informations corresponding to those areas lying between the picture elements. The color-separating optical means may be formed by either one of a color dispersion prism, a dichroic mirror, a diffraction grating, a glass block made of a medium of heterogeneous material and a light-divider containing liquid crystal.

5 Claims, 20 Drawing Sheets

HIGH RESOLUTION IMAGE PICKUP SYSTEM WITH COLOR DISPERSION MEANS

BACKGROUND OF THE INVENTION (a) Field of the Invention

The present invention relates to an image pickup device suitable especially for endoscopes or the like, which is arranged to use a solid state image sensor to pick up an image of an object formed by an image-forming lens and to perform color display of this image.

(b) Description of the Prior Art

In an image pickup device, in general, using a solid-state image sensor as the image pickup means, the resolution of image is determined by the number of the picture elements (number of the light-receiving elements) which are provided on the image sensor. However, a solid-state image sensor having a large number of picture elements presents not a few problems in its manufacture, and there has been a difficulty in putting to practice the image sensor having a sufficiently large number of picture elements.

In order to solve this problem, therefore, there has been proposed in, for example, Japanese Patent Publication No. Sho 56-40546 an image pickup device which is of a structure representing the so-called "picture element displacement technique" that a plurality of image sensors are arrayed in such a manner as to be shifted in position relative to the optical axis of the image-forming lens by, for example, ½ pitch or ⅓ pitch of the interval between the picture elements so that the relative positions of the images on the arrayed picture elements in one image sensor differ from those on the arrayed picture elements of another image sensor, so that the informations corresponding to the sites lying between the picture elements of one image sensor can be picked up also by another image sensor, to thereby enhance the resolving power.

However, in a known device of such a system as mentioned above, it should be noted that, in order to set the amount of displacement of the image at a predetermined value, relative positioning of a plurality of image sensors requires to be effected by displacing them relative to each other, so that there has been the problem that the fabrication of the optical system is very troublesome.

SUMMARY OF THE INVENTION

It is, therefore, a primary object of the present invention to provide an image pickup device which can improve resolving power and which is easy to fabricate.

According to the present invention, the above object is attained by disposing a color-separating optical means between an objective lens and a solid-state image sensor so that the respective color images of an object which are focused at mutually displaced sites on the solid-state image sensor are integrated together into a unified image, so that the informations corresponding to the areas located between respective picture elements are obtained also.

Another object of the present invention is to provide an image pickup device which eliminates degradation of the integrated color image brought about by chromatic aberration of the images for the respective colors.

According to a preferred formation of the present invention, a color-separating optical means is comprised of a color-dispersing prism, and is constructed so that the amounts of displacement of respective color lights and/or the directions of displacement thereof can be adjusted as required.

According to another preferred formation of the present invention, the color-dispersing optical means is comprised of an optical device provided with a dichroic mirror, allowing respective color lights to emit in a state that these color lights are displaced in parallel relative to each other. Whereby, chromatic aberration of images for respective colors is eliminated, and thus an integrated color image of a superior quality can be obtained.

According to still another preferred formation of the present invention, the color-dispersing optical means is comprised of a diffraction grating. The diffraction grating can use the transmission type and the reflection type.

According to yet another preferred formation of the present invention, arrangement is provided so that the respective color lights which are so separated from each other by the color-dispersing optical means can be emitted in two directions which cross each other at right angles. Whereby, the resolving power can be enhanced further.

According to a further preferred formation of the present invention, arrangement is provided so that the color-dispersing optical means, the solid-state image sensor or other optical devices are pivoted in synchronism with the vertical synchronizing signal delivered from the image signal processing circuit, to thereby further enhance the resolving power.

These and other objects as well as the features and the advantages of the present invention will be apparent from the following detailed description of the preferred embodiments when taken in conjunction with the accompanying drawings.

DETAILED DESCRIPTION OF THE PREFERRED EMBODIMENTS

Description will hereunder be made of the details of the present invention based on the illustrated respective embodiments.

Figure 1:
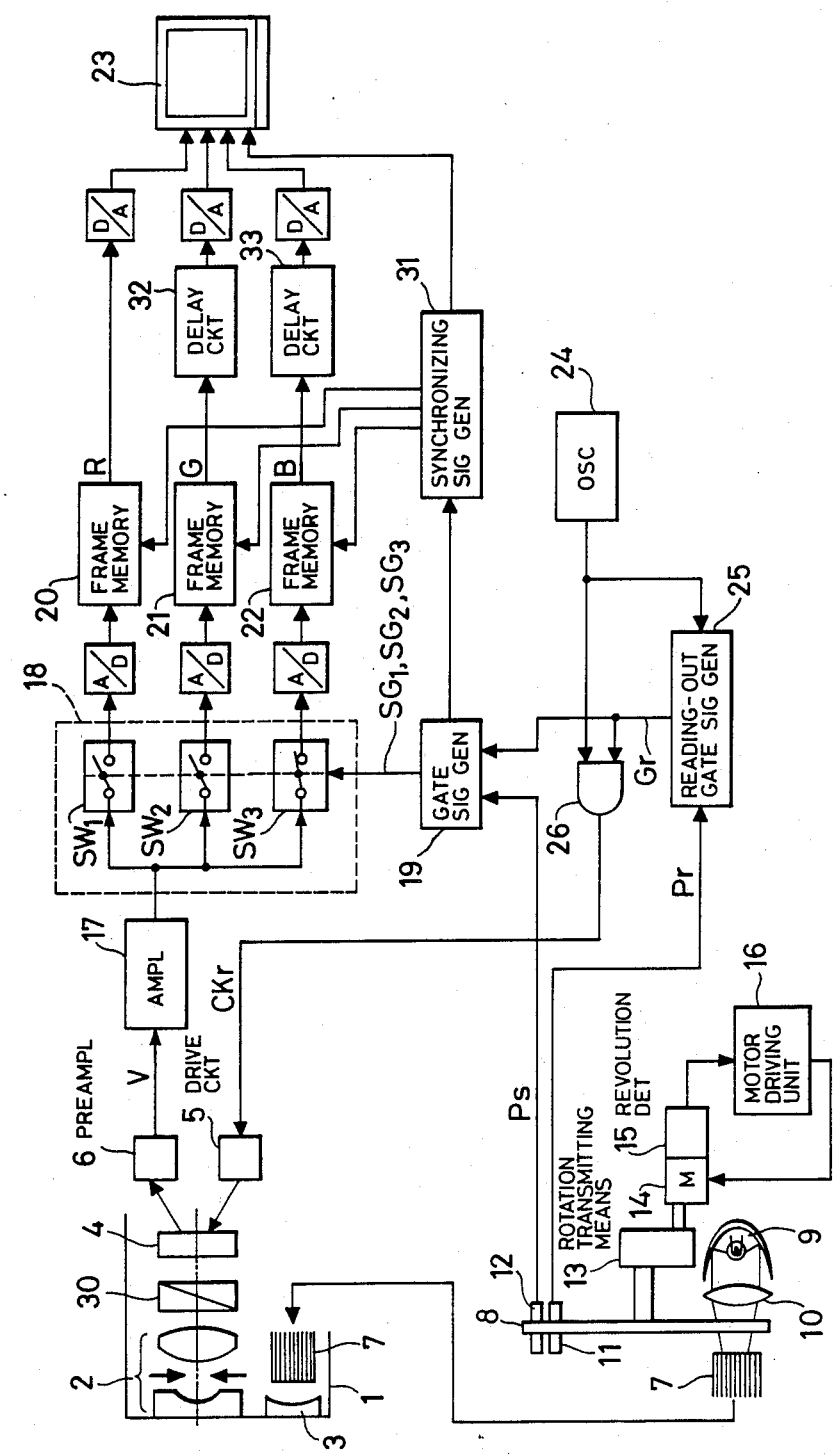
FIG. 1 is a block diagram of an embodiment of the image pickup device according to the present invention.

FIG. 1 is an illustration showing the structure of the electronic image pickup device for endoscopes as an embodiment of the image pickup device according to the present invention which is of the type that the respective color lights, i.e. red color light R, green color light G and blue color light B, are irradiated in successive order onto an object under observation.

Figure 2:
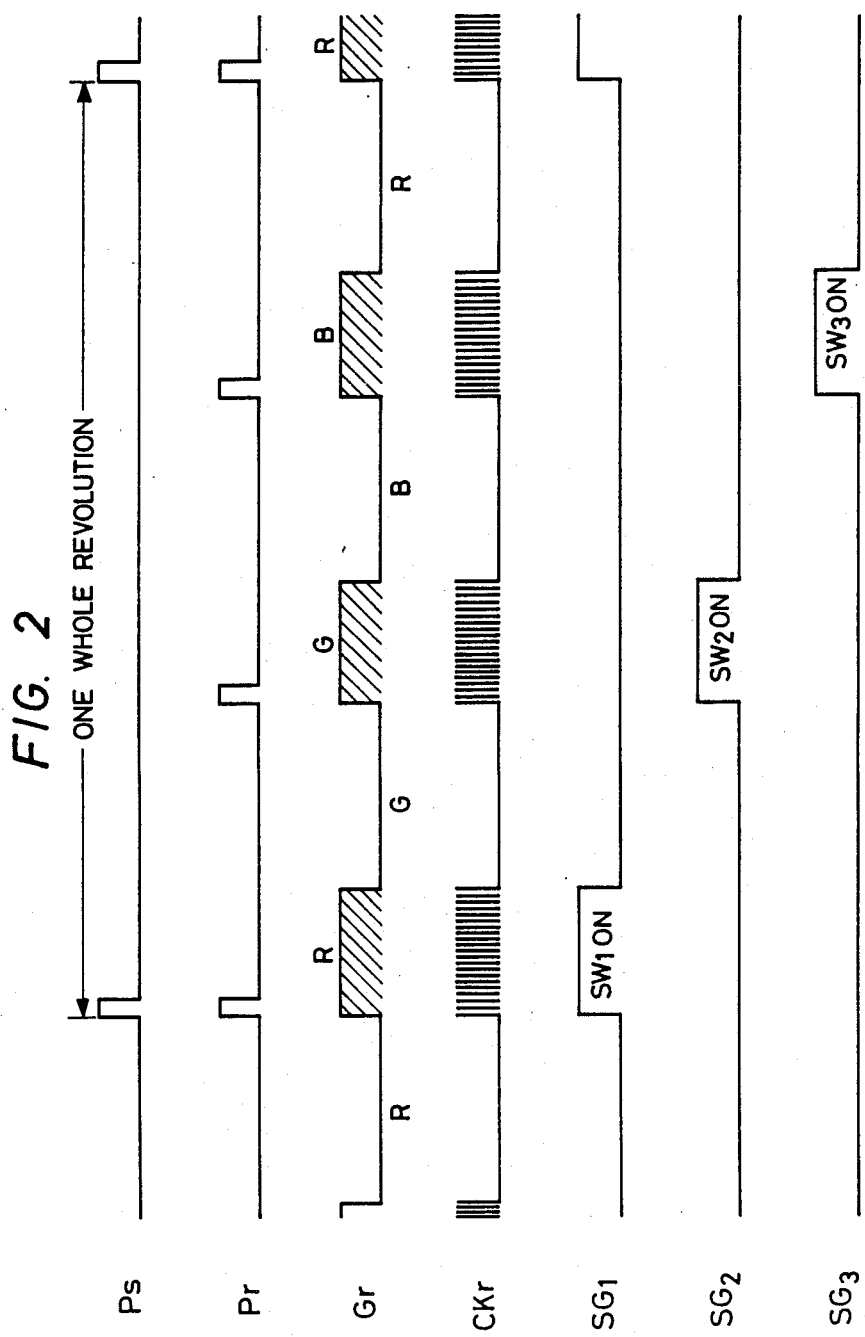
FIG. 2 is a timing chart for explaining the operation thereof.

FIG. 2 is a timing chart explaining the operation of this embodiment.

Figure 3:
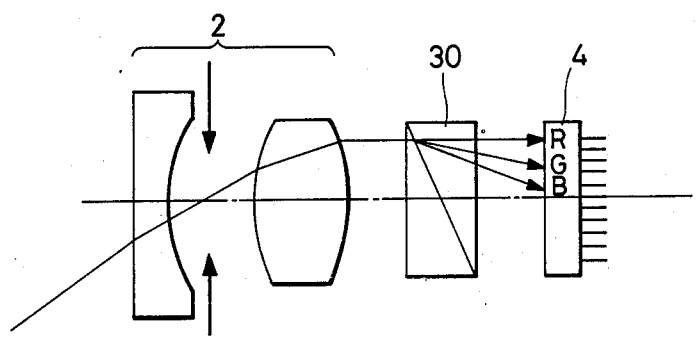
FIG. 3 is an enlarged illustration of the essential portion of the embodiment of FIG. 1.

In FIG. 1, reference numeral 1 represents the forward end portion of an endoscope. Within this forward end portion, there are provided an objective lens 2 (which is telecentric optical system which has been satisfactorily compensated for its chromatic aberration) and an illumination lens 3 which are arranged in parallel with each other. Rearwardly of said objective lens 2 is disposed a line sequential transfer type solid-state image sensor 4, so that the image of an object whose light has been received and converted into photo-electric signals by the image sensor is read out by drive circuit 5 as a picture signal V and that this picture signal is transferred to the circuitry of the subsequent stage via a preamplifier 6. Also, a color-dispersing prism 30 is disposed between the objective lens 2 and the solid-state image sensor 4 so as to disperse the respective color lights, i.e. red color light R, green color light G and blue color light B, in a plane parallel with the sheet of drawing, as shown in FIG. 3. Behind the illumination lens 3 is disposed a light guide 7 which is comprised by, for example, an optical fiber bundle, and arrangement is provided so that an illumination light is irradiated onto the light-incidence end surface of said light guide via a rotatably disposed filter disc 8. The illumination light is irradiated onto the filter disc 8 through a lens 10 from a light source lamp 9. This illumination light is caused to impinge onto the light-incidence end face of said light guide 7 via filters for R (red color light), G (green color light) and B (blue color light) which are arranged in successive order via an appropriate light-blocking or light-removing area intervening between the respective filters. The rotation axis of the filter disc 8 is coupled to a motor 14 via a transmission system 13. By a signal delivered from a revolution detector 15 provided on the motor 14, a motor driver 16 is controlled, to thereby maintain the revolution speed of this motor 14 constant. On the external circumferential portion of the filter disc 8 are provided a reading-out pulse detector 11 and a start pulse detector 12 to thereby effect synchronization of the operation of reading-out, etc. from, for example, the solid-state image sensor 4 with the revolution of the filter disc 8. On the other hand, the picture signal V coming from said preamplifier 6 is amplified by passing same through an amplifier 17 and thereafter it is inputted to a multiplexer 18. The multiplexer 18 is comprised of three switches $SW_1$, $SW_2$ and $SW_3$ corresponding to the signals R, G and B which are inputted thereto. These switches are changed over of their connections in succession at a predetermined frame cycle by respective switching gate signals $SG_1$, $SG_2$ and $SG_3$ (see FIG. 2) which are supplied from a multiplexing gate signal generator 19, to deliver image signals corresponding to the respective colors to respective frame memories 20, 21 and 22 for R, G and B, respectively, via an A/D converter. The respective color signals which have been accumulated in these respective frame memories 20, 21 and 22 are read out by the actions of a synchronizing signal generator 31, and they are integrated together as they are transferred either directly or passed through a delay circuit 32 or 33, and further through a D/A converter, to thereby be displayed in color on a screen of a color TV monitor 23. The reading-out pulse detector 11 mentioned above is intended to detect the respective terminal end positions of the respective filters for R, G and B which are arranged on the filter disc 8 in the direction of revolution thereof using the detected pulse (reading-out pulse) Pr of said detector 11 and also the signal delivered from an oscillator 24, a reading-out gate signal Gr is formed. This reading-out gate signal Gr is one for reading out the picture signal having been accumulated in the solid-state image sensor 4 during the period of time corresponding to the period in which the irradiation of the R, G and B lights does not take place. Jointly with the signal coming from the oscillator 24, said reading-out signal Gr is inputted to an AND circuit 26 to form a reading-out clock signal CKr to drive said driver circuit 5 to thereby convert the electric charge accumulated in said solid-state image sensor 4 to an image signal for each of R, G and B. On the other hand, the reading-out signal Gr, together with the detected pulse (start pulse) Ps supplied from the start pulse detector 12 (which detects one whole revolution of the filter disc 8), is inputted to the multiplexing gate signal generator 19 to thereby form the respective switching gate signals SG$_1$, SG$_2$ and SG$_3$ to effect changeover of the connection of the multiplexer 18 to input a picture signal for each of R, G and B to the respective frame memories 20, 21 and 22.

With such an arrangement as described above, it will be noted, as shown in FIG. 2, that, for each one whole revolution of the filter disc 8, one start pulse Ps is outputted to be delivered to the multiplexing gate signal generator 19, and also, for each whole revolution of the filter disc, three reading-out pulses Pr corresponding to the R, G and B filters, respectively, are outputted to be delivered to a reading-out gate signal generator 25. The reading-out signal generator 25 uses the signal supplied from the oscillator 24 to form a reading-out gate signal Gr having such a width of the same period as that of the reading-out pulse Pr and corresponding to the period of time in which R, G and B lights are not irradiated. Based on the period of time of this reading-out signal Gr, there are formed a reading-out clock signal CKr and switching ate signals SG$_1$, SG$_2$ and SG$_3$ to thereby obtain R, G and B signals which are required for color display. In the illustrated reading-out gate signal Gr, the hatched regions represent the periods of time for reading out R, G and B picture signals, respectively. The low level periods located preceding these hatched regions represent the periods of time in which the signal electric charges of R, G and B are accumulated in the solid-state image sensor 4 as a result of the irradiation of R, G and B lights. Accordingly, the switching gate signals SG$_1$, SG$_2$ and SG$_3$ stored in the frame memories 20, 21 and 22 for R, G and B are rendered to gate signals corresponding to the picture signal reading-out periods of R, G and B, respectively.

Figure 4:
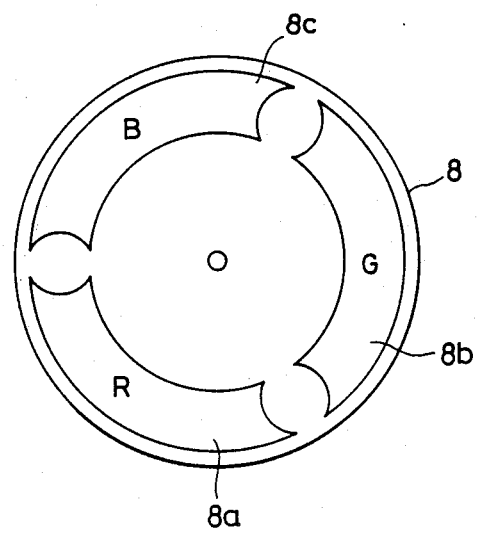
FIG. 4 is a front view of the filter disc in the embodiment of FIG. 1.

Here, the filter disc 8 is formed in such a way as shown in, for example, FIG. 4. More particularly, the disc 8 is constructed in such a way that filters 8a, 8b and 8c having such spectral transmittance as will transmit therethrough only R light, only G light and only B light, respectively, are arranged at an equal interval from each other on a same circumference. The respective terminal end portions of these filters 8a, 8b and 8c are each of an arcuate shape so as to match the cross sectional shape of the light bundle which is to be transmitted therethrough. Also, the amount of displacement of G light and that of B light relative to R light produced by the color-dispersing prism 30 are ½ pitch and 1 (one) pitch, respectively, of the interval between picture elements provided on the solid-state image sensor 4. The delays produced by the delay circuits 32 and 33 are set at ½ pitch and 1 (one) pitch, respectively.

Figure 5:
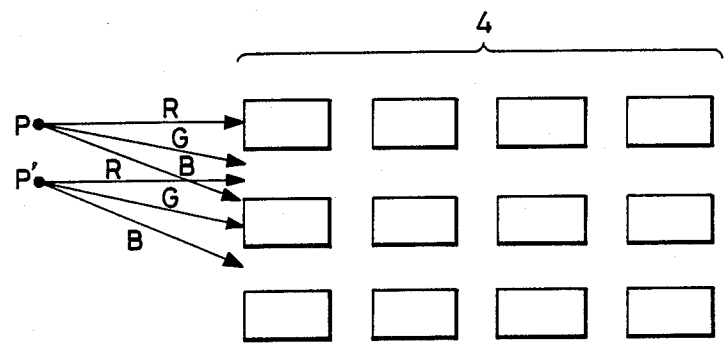
FIG. 5 is an illustration showing the image-pickup principle of the present invention.

The image pickup device according to the present invention is constructed as described above. Accordingly, due to the action of the color-dispersing prism 30, there develops displacement of the respective focusing positions for lights R, G and B. The displacements of lights G and B relative to light R are ½ pitch and 1 (one) pitch, respectively, of the interval between picture elements. As a result, as shown in FIG. 5, the images due to the respective lights G and B shift by ½ pitch and 1 (one) pitch, respectively, in the direction of advancement of the signals being transferred. Along therewith, the information concerning spot P' which corresponds to the interval between picture elements will be caused to arrive also at picture elements by virtue of light G. Therefore, these image signals thus obtained are integrated into a unified image in such a way that the image by light R is used directly, and that the image by light G is delayed by ½ pitch by the delay circuit 32 while the image by light B is delayed by 1 (one) pitch by the delay circuit 33, whereby an image containing also the information concerning the spot P' corresponding to the interval between picture elements is displayed on the screen of the TV monitor 23, and thus the resolving power is enhanced. It should be noted here, however, that in this case it is only light G that transmits the information concerning the spot P', and that, accordingly, it is only when the respective colors R, G and B are integrated together, i.e. only concerning the luminance signal, that brings about the enhanced resolving power.

Description has been made above with respect to the principle of the image pickup device of the present invention. It should be noted here that the image pickup device according to the present invention requires only the arrangement of a single color-dispersing prism at a predetermined position on the optical axis, and thus the positioning of the parts is easy, with the result that the fabrication of the device is easy.

Figure 6:
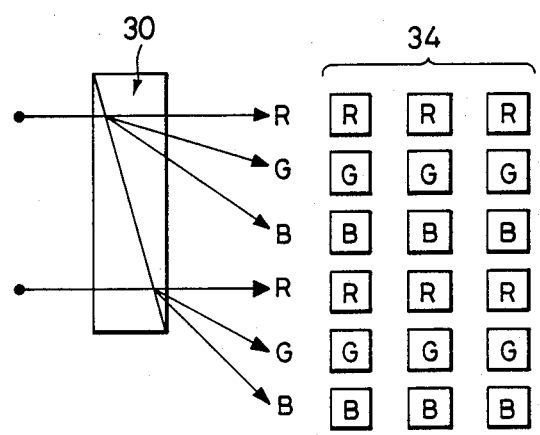
FIG. 6 to FIG. 8 are illustrations showing the essential portions of mutually different further embodiments, respectively, of the present invention.

FIG. 6 shows another embodiment wherein the present invention is applied to an image pickup device of the mosaic filter type. This provides for an example which is arranged so that the respective lights R, G and B which are so separated by a color dispersing prism 30 are caused to impinge at the ratio of 1:1 onto the R, G and B sectors, respectively, of a mosaic filter 34 which is disposed in the foreground of a solid-state image sensor 4. When an image is reproduced on the screen of a TV monitor, the respective lights emitting from a same single spot are reproduced also at a same single spot on the screen, hence the advantage that the color reproduction is performed with a further enhanced fidelity.

Figure 7:
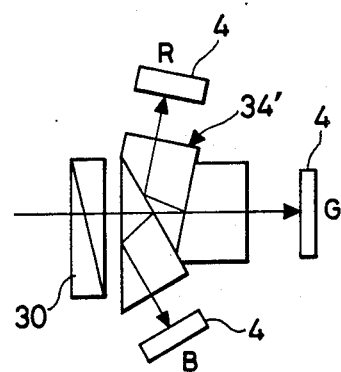

FIG. 7 shows another embodiment having an arrangement that a color-dispersing prism 30 is disposed in the foreground of a 3-color separation prism 34' in an image pickup device of the 3-CC system. This embodiment is of the arrangement that, since the light rays are refracted by the color-dispersing prism 30 with a magnitude of refraction differing with the individual inherent wavelengths of the component rays the images incident to the respective solid-state image sensors are to differ in position from each other accordingly. In this instance, it is only necessary to arrange the respective solid-state image sensors 4 so as to be aligned with the optical axes of the respective separated beams of color lights emitting from the 3-color separating prism 5 whereby the fabrication of the optical system is facilitated.

Figure 8:
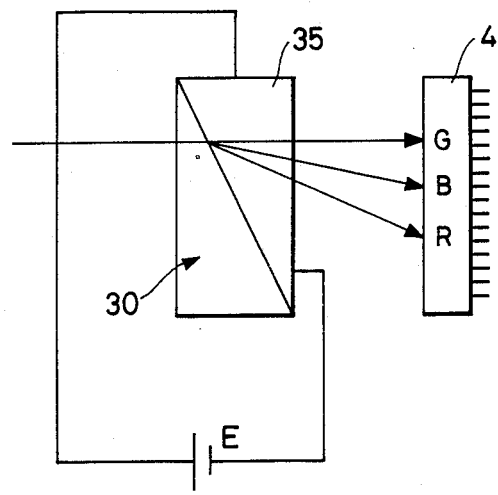

FIG. 8 shows a further embodiment having an arrangement that, in an 1-CCD system image pickup device, one 35 of the glass blocks of the color-dispersing prism 30 is comprised of an acousto-optical element, so that by varying the voltage applied to this latter element, the refractive index thereof is varied to render the amount of dispersion of light rays variable, whereby to make variable the amount of displacement of the resulting images impinging onto the image sensor.

In this embodiment, the amounts of dispersion of the respective color lights effected by the color-dispersing prism 30 tend to mis-match the amounts of delay which are performed by the respective delay circuits. Accordingly, it is desirable to provide an arrangement so as to allow adjustment of the delay time given by the delay circuits in compliance with the voltage applied to the color-dispersing prism.

Figure 9:
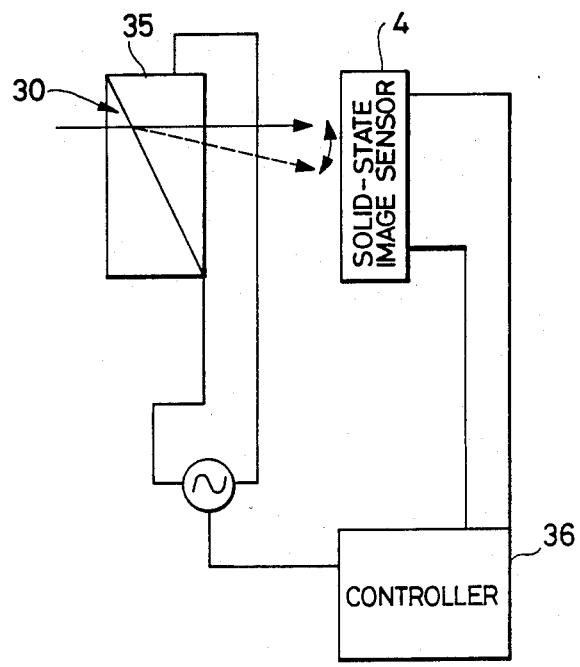
FIGS. 9, 10A and 10B are illustrations showing an essential portion of another embodiment of the present invention and showing the image pickup principle of such embodiment, respectively.
Figure 10A:
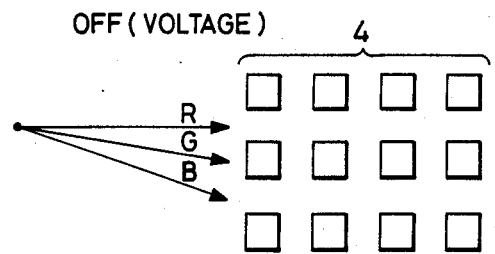
Figure 10B:
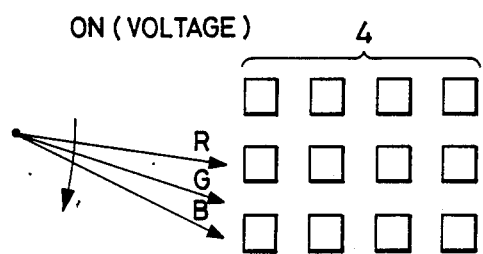

FIG. 9 shows a still further embodiment arranged so that, in a 1-CCD system image pickup device, the voltage applied to the variable refractive index type color-dispersing prism 30 is rendered "on" and "off" in synchronism with the interlace of the solid-state image sensor 4 by means of a controller 36. More particularly, when the solid-state image sensor 4 accumulates a signal of the first field, the applied voltage is rendered "off" to allow the respective color lights to advance as shown in FIG. 10A, whereas when the sensor 4 accumulates the signal of the second field, the voltage is so rendered (i.e. "on") as to allow the respective color lights to advance in such a manner as shown in FIG. 10B. The amount of displacement of the images at such a time is ½ pitch of the inter-picture-element interval. Also, in case of, for example, inter-line transfer system solid-state image sensor, the changeover timing need only to be synchronized with the pulse with which the signals are transferred from the respective picture elements over to the transfer registers. It will be needless to say that arrangement is provided so that the filter disc 8 is rotated in frame-synchronized fashion and that image-pickup is performed for every two fields for each of the three colors R, G and B. As such, according to this instant embodiment, there are obtained inter-picture-element informations for each of the colors R, G and B, so that resolution is enhanced not only for the luminance signals but also for chromatic signals. Also, in this instant embodiment, it is only for the vertical resolution that undergoes an enhancement of the resolving power. It should be noted, however, that by orientating the direction of displacement of image either sideways or oblique, it is possible to enhance horizontal resolution also. Furthermore, this instant embodiment is not limited to the field accumulation type, but it can be applied to the frame accumulation type as well.

Now, description will hereunder be made of the color-dispersion prism 30 in further detail.

Figure 11A:
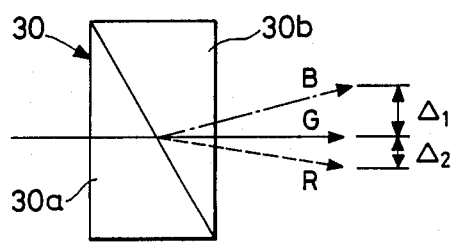
FIGS. 11A and 11B are illustrations for explaining the manner of color dispersion effected by the color-separating prism and the conditions therefor.
Figure 11B:
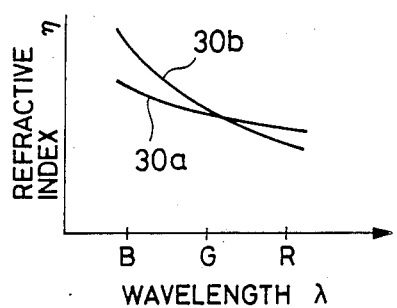

FIG. 11A shows the instance wherein the amount $\Delta_1$ of separation of blue color light B relative to green color light G by the color-dispersing prism 30 is greater than the amount $\Delta_2$ of separation of red color light R relative to green color light G. In this case, arrangement is provided so that green color light G makes a substantially straightforward advancement, therefore let us now assume that, in the two prism glass blocks 30a and 30b, $\eta_{1G}$ and $\eta_{2G}$ represent the refractive indices of these prism blocks 30a and 30b for the green light G, respectively, then the relationship between them is $\eta_{1G} \approx \eta_{2G}$. As such, in order to effect such a pattern of separation of colors for the respective color lights, it is only necessary to use, as the materials of the prism components 30a and 30b, such glass blocks having an equal refractive index for green light G and having such refractive indices relationship as $\eta_{1B} < \eta_{2B}$ for blue color light B and refractive indices relationship $\eta_{1R} > \eta_{2R}$ and also $\eta_{2B} - \eta_{1B} > \eta_{1R} - \eta_{2R}$ for red color light R, and to combine these two blocks having such color-dispersion characteristics as mentioned above. Here, $\eta_{1B}$, $\eta_{2B}$ and $\eta_{1R}$, $\eta_{2R}$ represent the refractive indices of the prism components 30a and 30b for blue color light B and red color light R, respectively. It should be noted here that green color light G does not necessarily have to make a straight-forward advancement. Therefore, it is only necessary that the manners of curving noted of the respective curves of dispersing characteristics of these two prism components 30a and 30b differ from each other as shown in FIG. 11B.

Figure 12A:
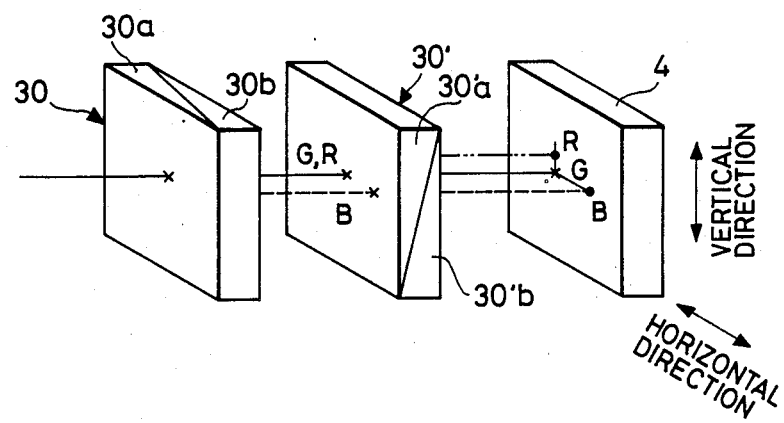
FIGS. 12A, 12B and 12C are illustrations for explaining the manner of color separation by a color-separating prism having a structure different from that shown in FIG. 11A and the conditions for effecting such separation of colors.
Figure 12B:
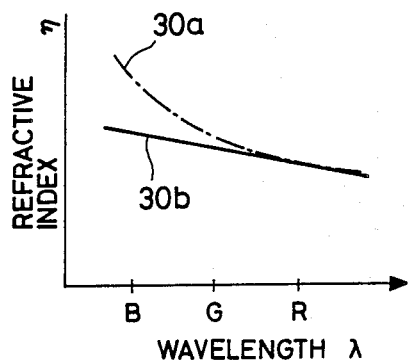
Figure 12C:
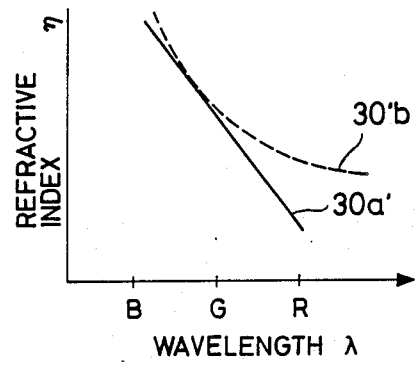

Next, in case it is intended to enhance the resolving power in both the horizontal and vertical directions, it is only necessary to displace the respective color light rays in both horizontal and vertical directions. FIG. 12A shows an example of the optical system which is arranged to satisfy this demand by the use of two color-dispersing prisms 30 and 30'. More particularly, the two prism blocks 30a and 30b which constitute the color-dispersing prism 30 have such color-dispersion characteristics that these two glass blocks have an equal refractive index for green color light G and red color light R, but they have mutually different refractive indices for blue color light B (which, in this example, $\eta_{1B} > \eta_{2B}$). Accordingly, in case the prism 30 is disposed in such a manner as shown in FIG. 12A, it will be noted that, in the color-dispersing prism 30, the refractive index for blue color light B is greater than the refractive indices for green color light G and red color light R, and the blue color light B is separated in the horizontal direction. On the other hand, the glass blocks 30'a and 30'b which are the components of the color-dispersing prism 30' have such color-dispersion characteristics that these components have an equal refractive index for blue color light B and green color light G but have mutually different refractive indices for red color light R as shown in FIG. 12C (in this case, $\eta_{3R} < \eta_{4R}$; wherein: $\eta_{3R}$ and $\eta_{4R}$ represent the respective indices of the component glass blocks 30'a and 30'b for red color light R, respectively). For this reason, in the color-dispersion prism 30' blue color light B and green color light G are not refracted, and only red color light R is upwardly refracted, so that the red color light R and the green color light G are separated from each other vertically, and thus, on the image-receiving surface of the image sensor 4, there are formed the images of the respective color lights R, G and B at positions which are separated in both horizontal and vertical directions relative to each other. It will be noted here that, in the color-dispersing prism 30, even when the component prism blocks 30a and 30b do not have an equal refractive index for green color light G and red color light R, there can be obtained color-separated images similar to that mentioned above only if the amounts of displacement of blue color light B and red color light R relative to green color light G are the same. This applies true to the color-dispersing prism 30' also.

Figure 13:
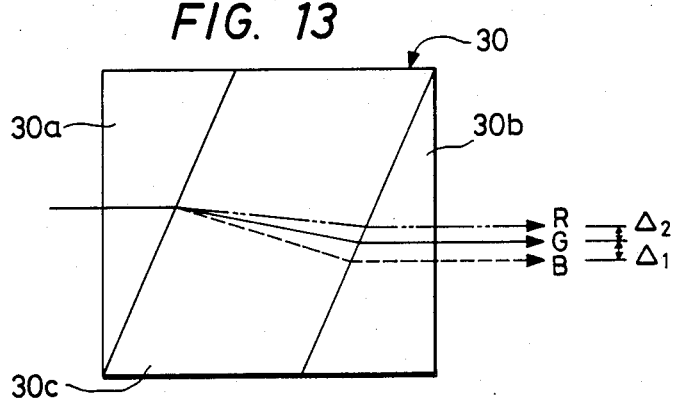
FIG. 13 is a side elevation showing still another structure of the color-dispersing prism.

In case the color-dispersing prism is of such a structure as described above comprising two triangular prisms which are bonded together, it is not possible to cause the principal light beams of the respective color lights coming after passing through the objective lens 2 along the optical axis to impinge onto the image-receiving surface in a direction normal to this surface, with the result that there can appear such color lights which impinge thereonto in oblique directions. In order to eliminate such a drawback, it is only necessary to provide a parallel plate 30c so as to be sandwiched between the two triangular prisms 30a and 30b which constitute a color-dispersing prism 30 as shown in FIG. 13. If, in this case, these two component triangular glass blocks 30a and 30b are of an identical material, the light which is refracted at the boundary between the prism 30a and the parallel plate 30c will return to the state of being parallel with that light incident to the prism 30a at the interface between the parallel plate 30c and the component glass block 30b, so that the light incident to the color-dispersing prism 30 will emit therefrom mutually separated red color light R, green color light G and blue color light B which are parallel with the incident light.

Figure 14:
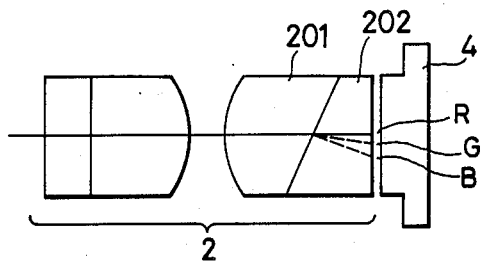
FIGS. 14 to 18 are block diagrams of further embodiments of the present invention which differ from each other.

FIG. 14 shows another embodiment designed so that, by altering Abbe's number of the lens component 201 from that of the lens component 202 which jointly constitute an objective lens 2, color dispersion is produced. In this embodiment, the lens components 201 and 202 are bonded together, and furthermore a solid-state image sensor 4 is bonded to the lens component 202, whereas the color-dispersion prism 30 is omitted. As a result, according to this instant embodiment, there are provided further advantages that the forward end portion 1 of the endoscope can be constructed in a more compact size, and that the fall-out of dust onto the image-receiving surface of the solid-state image sensor 4 can be prevented.

Figure 15:
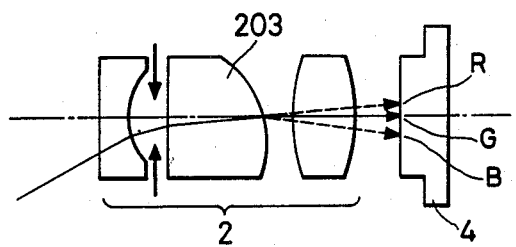

FIG. 15 shows still another embodiment such that one 203 of the lens components constituting an objective lens 2 is provided with an eccentricity, i.e. it is disposed in the optical axis of the objective lens 2 at such a position that differs from its own inherent optical axis, to thereby produce color dispersion. In this instant embodiment, arrangement is depicted in the drawing in such a way that green color light G impinges onto the center of the image-receiving surface of the solid-state image sensor 4. It should be noted, however, that, since this green color light G is brought there as a result of its refraction by the eccentrically disposed lens component 203, this color light is, therefore, not one which comes from a spot of an object positioned in the foreground of the objective lens 2, but is one coming from a spot of the object which is at a position located below the optical axis of the objective lens 2. Accordingly, this instant embodiment is suitable for use in case the objective lens 2 cannot be turned in the direction in which the observation is intended to be made due to mechanical restrictions of positioning within the space, e.g. such a case that, in spite of the endoscope being of the type designed for taking a perspective view, there is not any space available in the space wherein the objective lens 2 is inserted, other than just disposing the lens along the lengthwise direction of the endoscope. Also, as shown in FIG. 15, by arranging so that the optical axis of the light incident to the center of the image-pickup surface to cross the optical axis of the illumination system, this instant embodiment can be utilized also for the purpose of preventing the occurrence of parallax. It will be needless to say that the color dispersion can be achieved by relying on the difference in the magnitude of the refractive indices accruing from the wavelengths of the lights emitting from the lens component 203.

Figure 16:
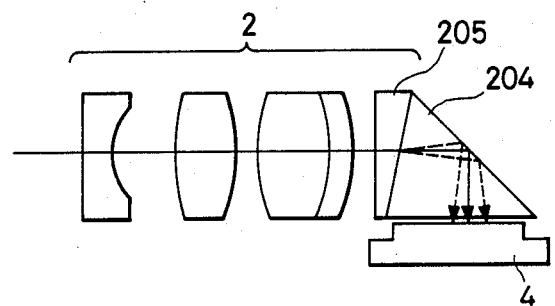

FIG. 16 shows a further embodiment arranged so that color dispersion is produced by a prism 204 which is employed when it is intended to dispose the solid-state image sensor 4 so as to bring the image-receiving surface of this solid-state image sensor 4 in parallel with the optical axis of the objective lens 2. In this case, it is necessary that the prism 204 and the prism 205 possess their Abbe's numbers which differ from each other.

Figure 17:
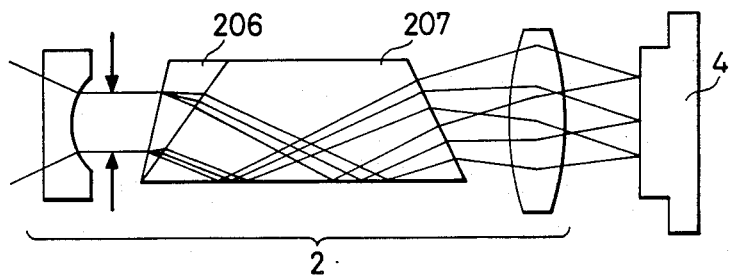

FIG. 17 shows a still further embodiment arranged so that an image-turning frusto-conical prism composed of prisms 206 and 207 is disposed within the objective lens system 2, to cause color dispersion by this frusto-conical prism.

As will be apparent from those embodiments described above, it is possible to construct a color-dispersing prism by disposing, in an image pickup optical system, various prisms or glass blocks either independently or in combination. It should be noted, however, that, in case a lens is placed between the color-dispersing prism and the image sensor which is disposed rearwardly thereof, there will occur an instance, in case the amount of color dispersion is small, that the respective color lights are converged in top one spot on the image-receiving surface of the image sensor, thus failing to provide separated color images, or an instance wherein the aimed purpose cannot be attained due to a shortage of the amount of color-dispersion. In such a case, it is necessary to employ such a color-dispersing prism as having a configuration (such as that shown in FIG. 17) wherein the inclinations of the respective color lights emitting from the color-dispersing prism differ substantially relative to each other.

Description has been made above with respect to various embodiments using a color-dispersing prism to perform color dispersion. It should be noted here that such a color dispersion can be realized also by the use of a dichroic mirror. Description will hereunder be made of respective embodiments utilizing a dichroic mirror.

Figure 18:
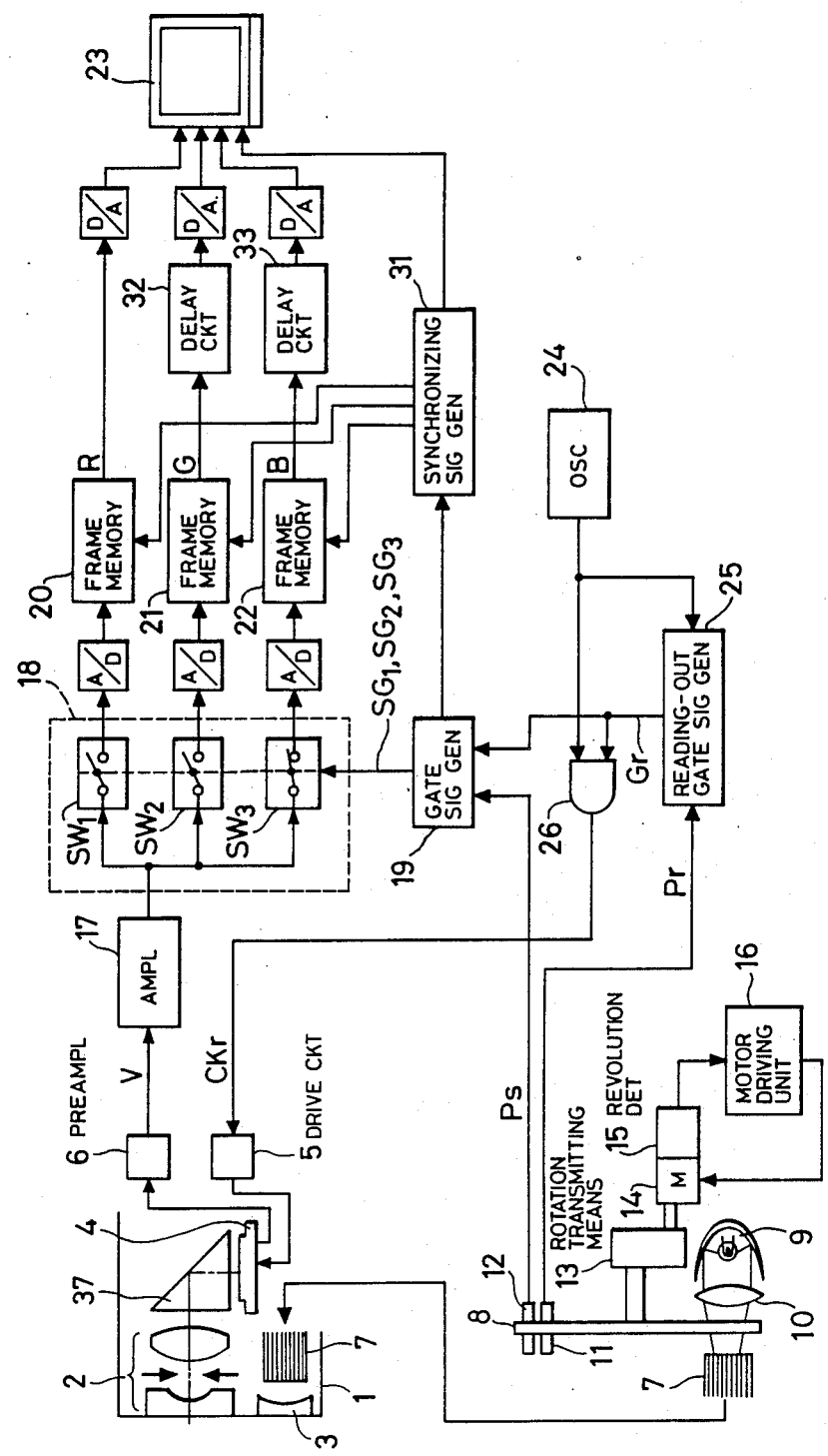
Figure 19:
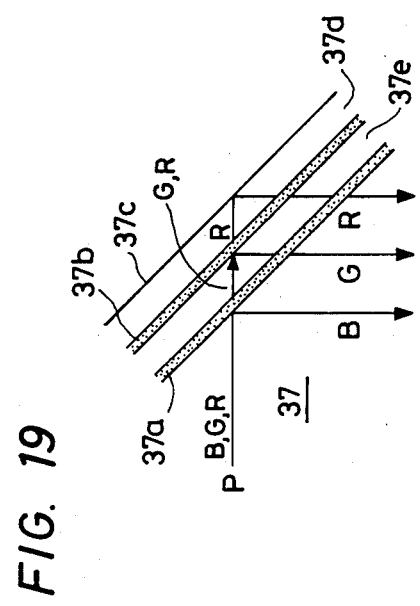
FIG. 19 is a partial enlarged illustration for explaining the detailed structure of the color-separating prism shown in FIG. 18.

FIGS. 18 and 19 show an embodiment thereof. According to this instant embodiment, a prism 37 having a dichroic mirror having such a structure as shown in FIG. 19 is disposed between a solid-state image sensor located at the forward end portion 1 of an endoscope and an objective lens 2. More particularly, the prism 37 is comprised, as shown in FIG. 19, of a dichroic mirror 37a transmitting green color light G and red color light R therethrough but reflecting blue color light B, a dichroic mirror 37b transmitting red color light R therethrough but reflecting green color light G, a total reflection plane 37c, and transparent layers 37d, 37e which intervene between them, the thicknesses of these transparent layers 37d and 37e being so selected as to correspond to the required image-displacement intervals, respectively. Usually, the size of picture elements is several ten (10) micrometers. The amount of displacement of image is either about the same as compared with the size of the picture elements or about one half thereof, so that the thicknesses of the transparent layers will be about several ten (10) times the wavelength of visible rays which are used ordinarily, so that there does not arise a substantial effect of degradation of function attributable to the interference occurring within the transparent layers 37c and 37d. It should noted here that the displacement of lights G and B relative to light R caused by the prism 37 is selected in such a way that, for example, it is ¼ pitch and ½ pitch, respectively, of the interpicture-element interval on the solid-state image sensor 4, while the delays effected by the delay circuits 32 and 33 are selected to be ¼ pitch and ½ pitch, respectively.

Figure 20:
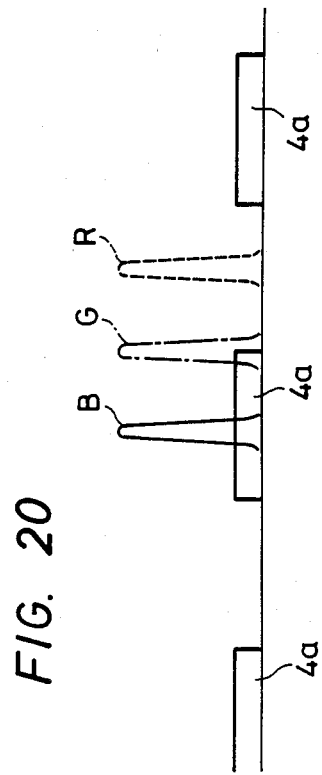
FIG. 20 is an illustration for explaining the relationship between the respective color lights which are to be so separated by the color-separating prism shown in FIG. 18 and the picture elements of a solid-state image sensor.

Accordingly, the focusing positions of red color light R, green color light G and blue color light B on the solid-state image sensor 4 develop displacement reactive to each other by the action of the prism 37. The displacements of green color light G and blue color light B relative to red color light R are ¼ pitch and ½ pitch, respectively, of the inter-picture-element interval. As a result, as shown in FIG. 20, the images by green color light G and blue color light B are displaced by ¼ pitch and ½ pitch, respectively, in the direction of advancement of the signals which are being transferred, and also the informations of spots corresponding to the locations lying between picture elements will arrive also at the picture element 4a by virtue of the green color light G and the blue color light B. As such, by integrating together the thus-obtained image signals directly with respect to red color light R, and with a delay of ¼ pitch by the delay circuit 32 for green color light G, and with a delay of ½ pitch by the delay circuit 33 for blue color light B, there is displayed on the screen of the TV monitor 23 an image which contains also those informations of spots corresponding to the sites located between the respective picture elements, thus enhancing the resolving power. In this instant case, it is only the green color light G and the blue color light B that transmit the informations of these spots, so that when the red color light R, green color light G and blue color light B are integrated together, the enhancement of the resolving power is limited to luminance signals.

As will be apparent from the foregoing description, the image by these respective color lights are formed at mutually different positions on the image pickup surface, so that there develops no chromatic aberration. Accordingly, it is possible to enhance the resolving power to the upper limit of possibility of improvement of resolution due to image displacement. Here, it should be noted that the transparent layers 37d and 37e are formed by vapor-deposition of such a material as $SiO_2$. Or, alternatively, these layers may be made with an adhesive film (e.g. a film made of a transparent bonding agent for optical use or a film of a high molecular polymer). Also, the thicknesses of the transparent layers 37d and 37e require to be such that at least "nd" (product of the refractive index and the thickness d of the transparent member) is same with or greater than the wavelength which is used, in order to avoid degradation of the image due to the interference effect of light at both the upper and bottom surfaces of the respective transparent layers 37d and 37e. The effect to improve the quality of image provided by the solid-state image sensor 4 cannot be obtained from a mere reckless increase of the thicknesses of the transparent layers 37d and 37e. Therefore, it is necessary to select such a thickness for these layers as will be capable of bringing about an amount of image displacement of the same order as that obtained from the inter-picture-element interval. Ordinarily, the above-mentioned thickness is set to a magnitude lying within the range from the same level up to zero time of the distance between picture elements.

Figure 21:
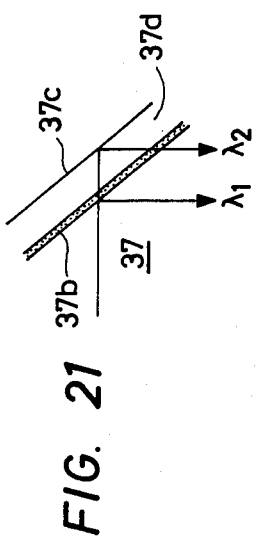
FIGS. 21 to 23 are partial enlarged illustrations showing mutually different other structural examples, respectively, of the color-separating prism shown in FIG. 18.

FIG. 21 shows a modified example of the above-mentioned embodiment. This embodiment is designed to split the incident light bundle into two sub-bundles of light. As the dichroic mirror 37b of the prism 37, there can be considered the following three types, i.e. one of them has the patter of characteristics that the dichroic mirror reflects blue color light B but transmits green color light G and red color light R therethrough, another has the characteristics that the mirror reflects green color light G, but transmits blue color light B and red color light R, and the other is represented by the characteristics that the mirror reflects red color light R but transmits blue color light B and green color light G. Also, in the instant embodiment, the reflection surface 37c employs a total reflection surface.

Figure 22:
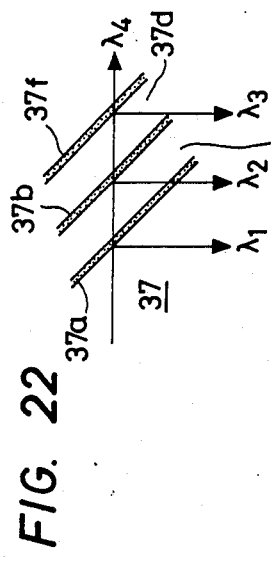

FIG. 22 shows another modification of the above-described embodiment. This embodiment is of the type that dichroic mirrors are provided in three layers, whereby the light bundle is split into three different colors, and that non-useful or harmful color light ($\lambda_4$) is allowed to pass through the reflection surface of the final dichroic mirror 37f to remove this color light. As a harmful light, there can be considered infrared light other than that mentioned above. The solid-state image sensor 4 usually possesses a sufficiently intensive sensitivity to infrared light also, so that a filter for eliminating infrared light is disposed in the optical path. In this instant embodiment, however, arrangement is provided so that the effect of enhancing the resolving power by virtue of the picture element displacement technique and also the effect of removing infrared light can be obtained at the same time.

Figure 23:
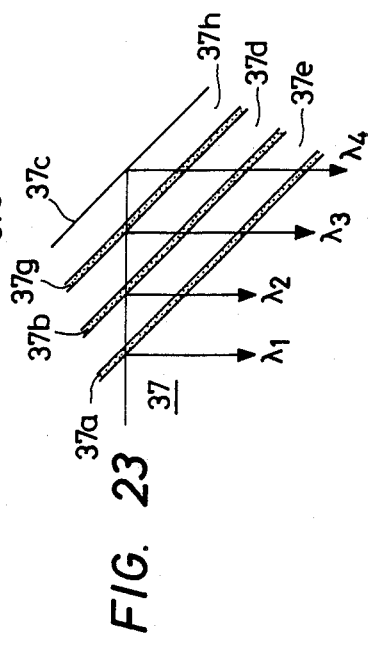

FIG. 23 shows a further modification of the above-described embodiment. In this embodiment, the prism is comprised of three-layered dichroic mirrors 37a, 37b and 37g and a total reflection surface 37c, to thereby split the light bundle into four sub-bundles of light, thus realizing displacement of color images. This embodiment is suitable for use in case it is intended to integrate images including infrared light in addition to red color light R, green color light G and blue color light B. This instant embodiment is effective when it is intended to discriminate a light having a specific wavelength such as fluorescent ray emitting from cancer cells.

Other than the above-mentioned embodiments, it is also possible to increase the number of dichroic mirrors to thereby comply to the number of the divided colors.

Figure 24:
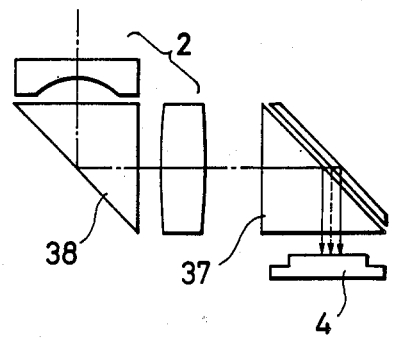
FIGS. 24 to 29 are illustrations showing the essential portions of mutually different further embodiments, respectively, of the present invention.

FIG. 24 shows another embodiment. This embodiment represents an arrangement that a triangular prism 38 is disposed in the foreground of a prism 37. As compared with the embodiments shown in FIGS. 19, 22 and 23 which provide for a mirror image, the instant embodiment has the advantage that a correct image can be obtained.

Figure 25:
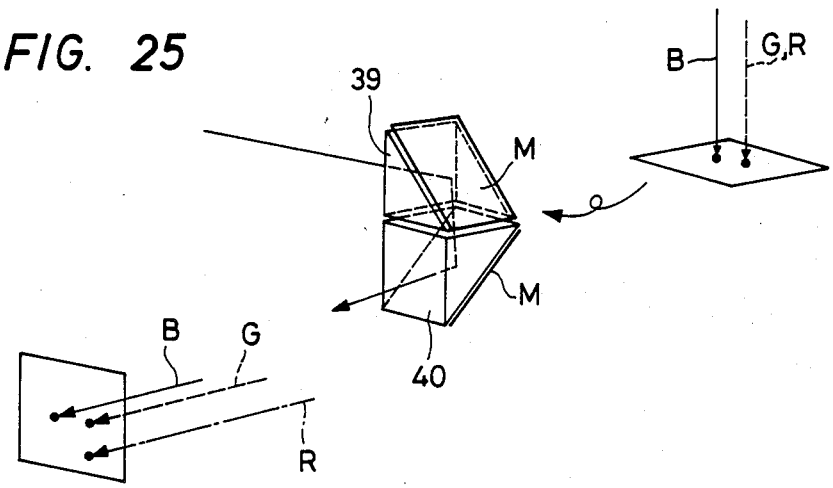

FIG. 25 shows still another embodiment. This embodiment provides an arrangement that, as the structure for obtaining a correct image, there are disposed, in place of the triangular prism 38 of the embodiment of FIG. 24 which is disposed in the foreground of the prism 37, two triangular prisms 39 and 40 rearwardly of the prism 37 in such a way that the directions of bending the light bundle by these two prisms are displaced for an angle of 90° relative to each other as illustrated. This embodiment features that a correct image can be obtained, and also that, by attaching a dichroic mirror and a reflection surface to each inclined surface M of the two triangular prisms, the direction of displacement of the colors of the images has been made possible not only in one direction, but also in two dimensions. Thus, for the reasons mentioned above, a better displacement of the colors of an image can be realized. For example, there can be considered an arrangement that, in the front-side prism 39, the spectroscopic characteristics of the dichroic mirror are such that it reflects blue color light B but transmits green color light G and red color light R, and the characteristics of the reflection surface are such that it reflects green color light G and red color light R (this surface may be a total reflection surface), while in the rear-side prism 40, the spectroscopic characteristics of the dichroic mirror are such that it reflects blue color light B and green color light G but transmits red color light R and that the characteristic of the reflection surface is such that the surface reflects red color light R (this surface may be a total reflection surface). Here, it is apparent that the devices of these embodiments will equally satisfactorily function even when the manner of combination of reflection and transmission for blue color light B, green color light G and red color light R is interchanged between them other than the combinations mentioned above.

Figure 26:
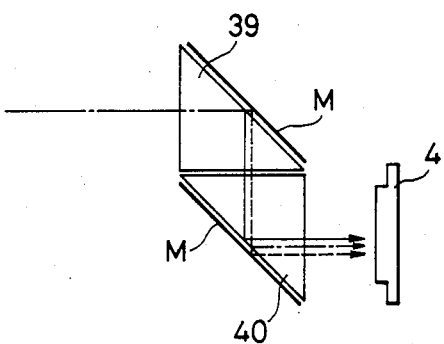

FIG. 26 shows a yet another embodiment. This instant embodiment is of the arrangement that those prisms 39 and 40 shown in the embodiment of FIG. 25 are disposed so as to cause the bent optical path to lie on a same plane. A pair of a dichroic mirror and a reflection surface mutually having different characteristics are attached to the respective surfaces M of the two prisms 39 and 40, and the light bundle is split by the respective dichroic mirrors and reflection surfaces into three sub-bundles of light. For example, there can be considered an arrangement such that, in the front-side prism 39, its dichroic mirror has the spectroscopic characteristics such that it reflects blue color light B but transmits green color light G and red color light R therethrough, and the reflection surface has the characteristic that it reflects red color light R (this surface may be a total reflection surface), while in the rear-side prism 40, the dichroic mirror has the spectroscopic characteristics that it reflects blue color light B and green color light G but transmits red color light R therethrough, and the reflection surface has the characteristic that it reflects red color light R (this surface may be a total reflection surface). It is clear that the aimed result can be obtained also from inter-changed combination of reflection and transmission for B, G and R.

Figure 27:
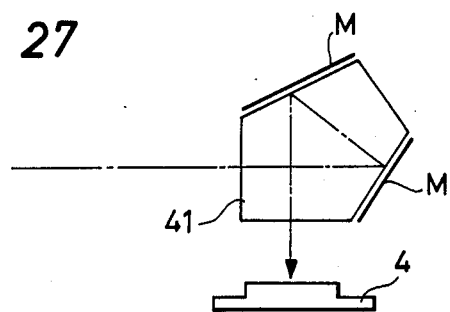

FIG. 27 shows a further embodiment. This is an example that a penta-prism 41 is utilized as the structure for performing displacement of image, while obtaining a correct image also. That is, image-displacement is performed by attaching a dichroic mirror and a reflection surface onto either one or both of the surfaces M, M at two sites.

Figure 28:
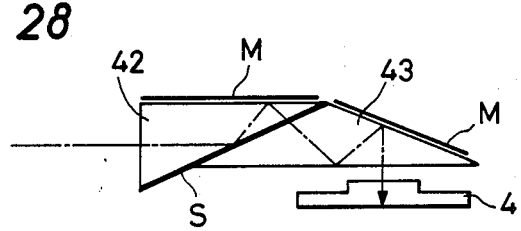

FIG. 28 shows a still further embodiment. This is an embodiment designed for realizing the fabrication of the optical system in a compact size by an arrangement designed for developing reflections four (4) times. Needless to say, a correct image ca be obtained also. In this embodiment as well, a dichroic mirror and a reflection surface are attached to either one or both of the two surfaces M, M at two sites to perform displacement of an image. Also, in this instant embodiment, there is provided, at the bonded interface S of a prism 42 and a prism 43, a layer formed by vapor-deposition of a material having such a thickness that "nd" (refractive index multiplied by thickness of the material) is equal to or greater than the wavelength λ which is employed. Transmission and reflection are carried out at this surface S utilizing the difference in refractive index between the prism and the layer of vapor-deposition material. As the vapor-deposition material, there can be considered, for example, $SiO_2$, $MgF_2$, etc. In the instant embodiment, $MgF_2$ is subjected to vapor-deposition to a thickness of 1000 nm, whereby to perform reflection and transmission in accordance with the angle of incidence of a light bundle onto the bonded interface S of the prism. This arrangement provides for the advantage that, owing to the fabrication performed by first aligning the prism to the optical axis and then performing bonding and fixing, there can be formed an optical system which is simple in its entire structure and which does not develop displacement of the center axis. It should be noted here that, in case a layer of air is provided without performing said bonding, the holdability of the positional relationship of the constituent members becomes poor, so that there cannot but be provided a gap of a certain extent, hence the drawback that the quality of the image obtained is degraded due to the aberration such as astigmatic difference which is produced due to the oblique passage of the optical axis through this layer of air. In this embodiment, the advantage obtained from the attachment of $MgF_2$ onto the bonded interface S is represented by unfailing development of total reflection and transmission as a result of the attachment of a layer of a low-refraction index having a predetermined thickness onto the plane S. In case these two prisms are bonded together directly by a bonding agent, there could occur inconveniences accruing from the refractive index and/or the thickness of the bonding agent.

Figure 29:
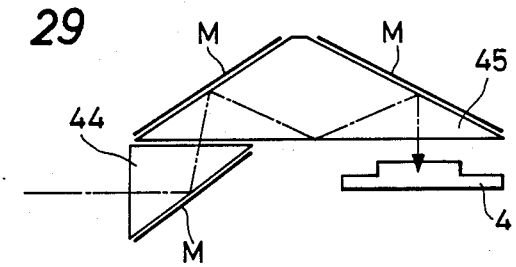

FIG. 29 shows a yet further embodiment. This instant embodiment also has the four (4)-reflection structure similar to the embodiment of FIG. 28, and a correct image which does not produce a mirror image can be obtained. The prisms 44 and 45 in this embodiment have reflection surfaces M at three sites. Thus, a variety of arrangement styles of the dichroic mirror and reflection surface become feasible.

Figure 30A:
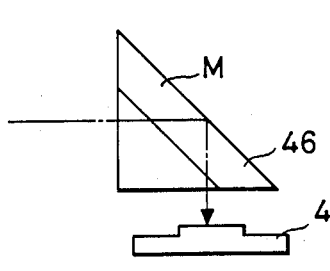
FIG. 30A is an illustration showing the essential portion of another embodiment of the present invention.
Figure 30B:
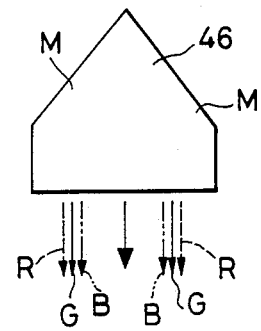
FIG. 30B is a right-side elevation of FIG. 30A.
Figure 31:
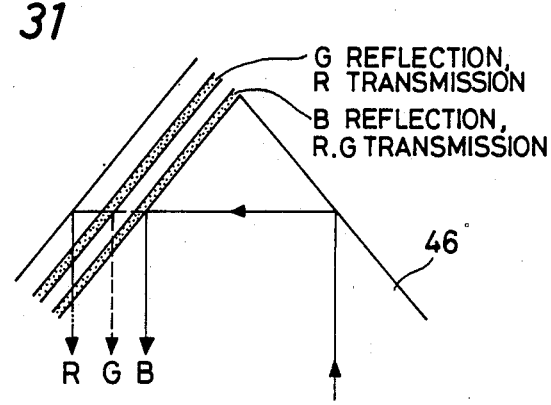
FIGS. 31 and 32 are partial enlarged illustrations showing mutually different detailed structures, respectively, of the color-separating prism of FIG. 30B.
Figure 32:
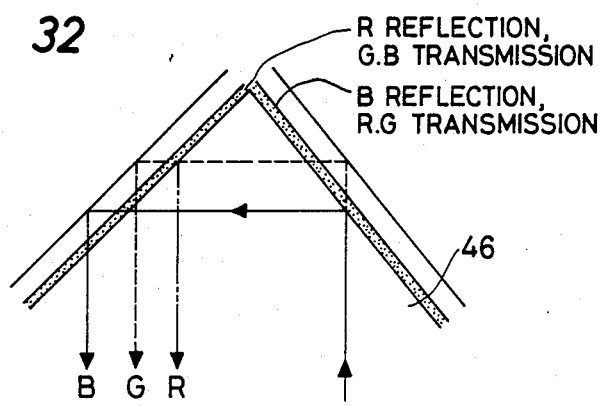

FIGS. 30 to 32 show still further embodiments. These embodiments feature the structure that a dichroic mirror and a reflection surface are attached to one of the inclined Dach surfaces of a Dach-prism 46, or a dichroic mirror and a reflection surface both having mutually different characteristics are attached to both of the slant surfaces of this prism. More particularly, FIG. 31 shows the structure that a dichroic mirror and a reflection surface are attached to one of Dach surfaces. FIG. 32 shows the structure that a dichroic mirror and a reflection surface having mutually different characteristics are provided on both of the slant Dach surfaces, one on one slant surface.

Figure 33:
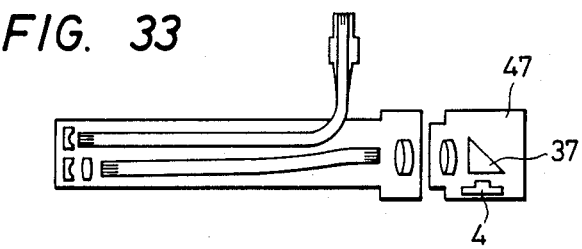
FIGS. 33 and 34 are illustrations showing another example of mutually different uses of the color-separating prism and the color-dispersing prism.
Figure 34:
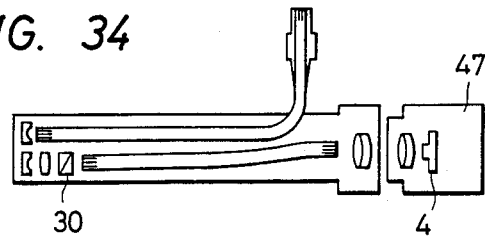

Description has been made of the embodiments of structures bringing about image displacement performed by the image pickup device of an endoscope having a solid-state image sensor disposed at the forward end portion thereof. It should be noted, however, that the above-mentioned structure may be disposed as shown in FIG. 33 within an externally attached TV camera 47 provided with a solid-state image sensor. That is, in the example of FIG. 33, a prism 37 is disposed in the foreground of the solid-state image sensor. In place of this prism 37, either one of the already-described other structures may be used. Also, in case of an endoscope of the type which is used by attaching a TV camera rearwardly of an ocular lens, the prism 37 is omitted and either one of the already-described structures such as the color-dispersing prism 30 may be introduced in the objective lens in place of said prism 37 as shown in FIG. 34. In case of this latter structure, it should be noted that, by setting the magnitude of the displacement of the image due to color dispersion at the light-incidence end face of the image guide to ½ or ⅓ of the arrangement pitch of fibers which constitute the image guide, there is obtained the effect that that mesh patter of the emitting end face of the image guide fibers which is picked up by the TV camera disappears on the screen of the TV monitor. The processing circuitry system can utilize the one shown in the embodiment of FIG. 1 without modifying it.

In the above-mentioned respective embodiments, the distance from the object up to the image pickup surface can differ somewhat depending on the wavelength. In case such a difference causes an inconvenience for the user, the difference in the length of the optical path can be cancelled out by arranging in such a way that a counter chromatic aberration is produced by a focusing lens. Or, conversely, by an appropriate arrangement of the array of colors, it is also possible to compensate for the insufficiency of chromatic aberration done by the focusing lens. Also, in the respective embodiments, a dichroic mirror is employed. In case, however, that this dichroic mirror is replaced by a half mirror having no wavelength characteristic, it will be noted that multiple images will be formed always on the image pickup plane irrespective of whatever type of image pickup system (such as sequential transfer system, dot sequential transfer system, etc.) may be employed. This arrangement provides for a function same as that obtained from an optical low-pass filter which utilizes a double refraction plate made of crystal, etc. disposed in the optical path in, usually, a TV camera. Accordingly, in case of an arrangement requiring a prism in the optical path, it is possible to omit a crystal low-pass filter by the use of a half mirror (whose transmittance is not limited to ½, but is appropriately determined depending on the selection of the brightness of the individual images in the multiple images) in place of the dichroic mirror employed in the respective embodiments described above.

Figure 35A:
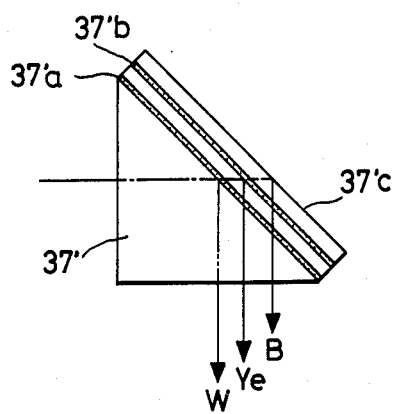
FIGS. 35A to 35D are illustrations showing further structural examples of the color-separating prism and the reflection characteristics thereof.
Figure 35B:
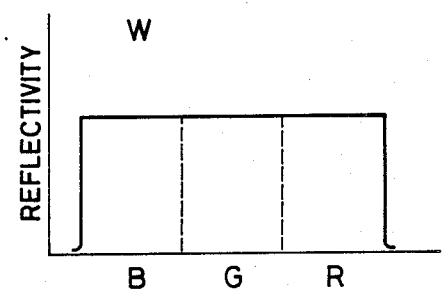
Figure 35C:
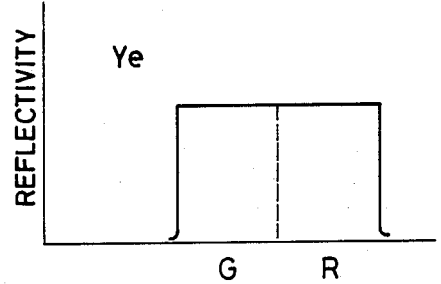
Figure 35D:
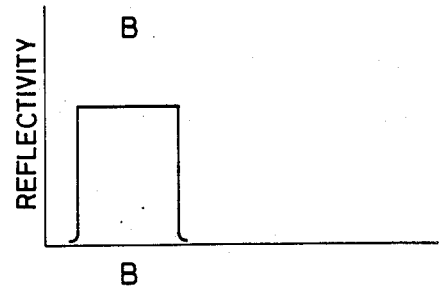

Description has been made above with respect to various embodiments based on the concept that filters for the three primary colors of R, G and B are used on a filter disc 8. It will be noted here that, in their place, there may be used complementary color filters of cyan Cy, magenta Mg and yellow Ye. Or, a combination of these filters may be used. In case color-compensating filters are utilized, the amount of light incident to the image pickup sensor will increase, so that this is advantageous especially for the instance where the object under observation is dark. FIG. 35A shows, as an example of such case, a prism 37' having a dichroic mirror 37'a which reflects white light W (see FIG. 35B) but transmits yellow color light Ye and blue color light B therethrough, a dichroic mirror 37'b which reflects yellow color light (see FIG. 35C) but transmits blue color light B therethrough, and a total reflection surface 37'c (see FIG. 35D). Dichroic mirrors having such reflection characteristics as mentioned above can be realized by the employment of a multi-layered interference film.

Figure 36:
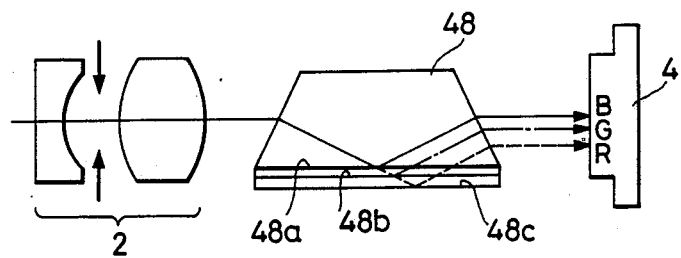
FIG. 36 is an illustration showing the essential portion of a still further embodiment of the present invention.

FIG. 36 shows an embodiment which uses a frustoconical prism 48 in place of the triangular prisms 37 and 37'. There may be considered various types of characteristics for the reflection films 48a, 48b and 48c which constitute a dichroic mirror. In this embodiment, however, the light is split into blue color light B, green color light G and red color light R, successively, from top to bottom. This arrangement can be used in the endoscope of the direct view type.

Figure 37:
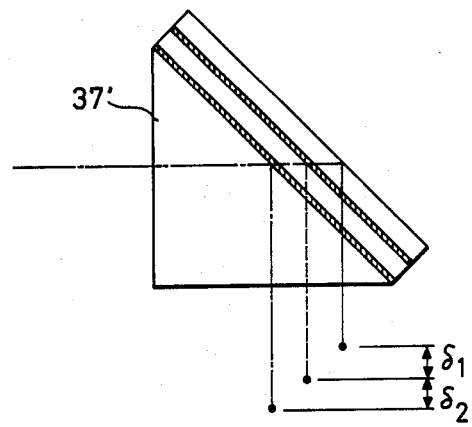
FIG. 37 is an illustration showing that the image-focusing positions of the respective color lights which are so separated by the color-separating prism differ from each other.
Figure 38:
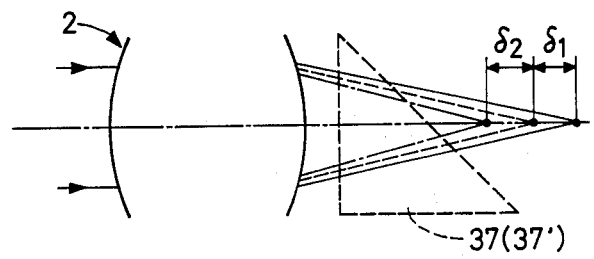
FIGS. 38 and 39 are illustrations showing mutually different examples of the method of compensating for the relative displacement of the focusing positions of the respective color lights.
Figure 39:
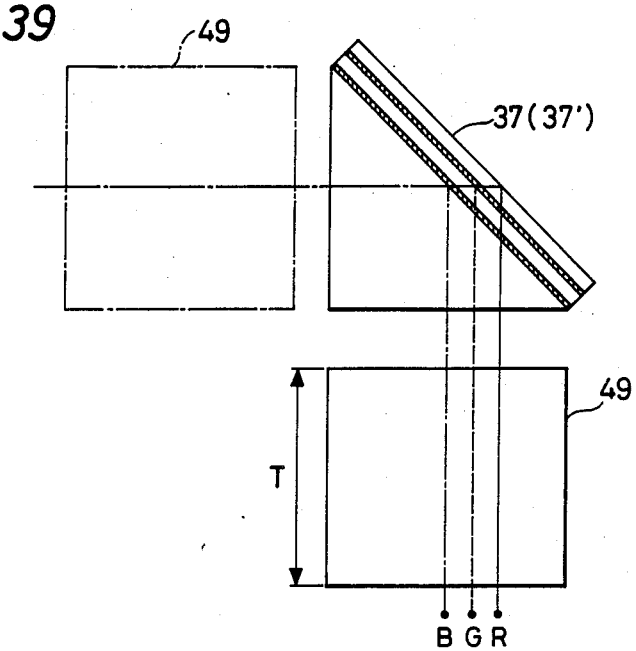

In case separation into the respective color lights is performed by using such a multi-layered reflection film as mentioned above, the positional intervals between the respective color lights which are so divided from each other, i.e. the amounts of positional lags (displacement) therebetween, are each selected arbitrarily within the margin of the width of a single picture element, whereby making it possible to arbitrarily control the image resolution characteristic. These amounts of displacement rely on the intervals between respective reflection films. Now, in case the amounts of these positional lags are great, there will arise the problem that the focusing positions of the respective color lights shift in the direction of the optical axis as shown by $\delta_1$ and $\delta_2$ in FIG. 37. As the means of compensating for these positional lags $\delta_1$ and $\delta_2$, there are, for example, such methods as shown in FIGS. 38 or 39. That is, the method shown in FIG. 38 is one for compensating for the chromatic aberration of the objective lens 2 in such a way that it has an axial chromatic aberration corresponding to the above-mentioned positional lags $\delta_1$ and $\delta_2$ produced by the prism 37 (37'). The method shown in FIG. 39, on the other hand, is such that a thick plate glass block 49 having light-dispersing ability is disposed either in the foreground (shown by the chain line) or rearwardly (shown by solid line) of the prism 37 (37'), and by appropriately selecting the dispersing ability and the thickness of the glass block, the positional lags $\delta_1$ and $\delta_2$ are compensated for. Let us now assume that the thickness of the glass block 49 in the direction of the optical axis is T, and when this is subjected to equivalent air conversion, the result becomes $T/\eta_\lambda$, and this shows the thickness depends on wavelength. Accordingly, it is only necessary to select the material and thickness d of the glass block 49 in such a way that, when the refractive indices of this glass block for red color light R, green color light G and blue color light B are assumed to be $\eta_R$, $\eta_G$ and $\eta_B$, respectively, $\delta_1$ and $\delta_2$ will become $$\delta_1 = \left(\frac{1}{\eta_R} - \frac{1}{\eta_G}\right)d, \; \delta_2 = \left(\frac{1}{\eta_G} - \frac{1}{\eta_B}\right)d,$$

respectively.

Description has been made above, based on FIGS. 18 to 38, with respect to various embodiments which realize color dispersion by the use of a dichroic mirror. Such color dispersion can be realized also by the use of such members as diffraction grating, a prism of the distributed refractive index type, etc. Description will hereunder be made with respect to such embodiments.

Figure 40:
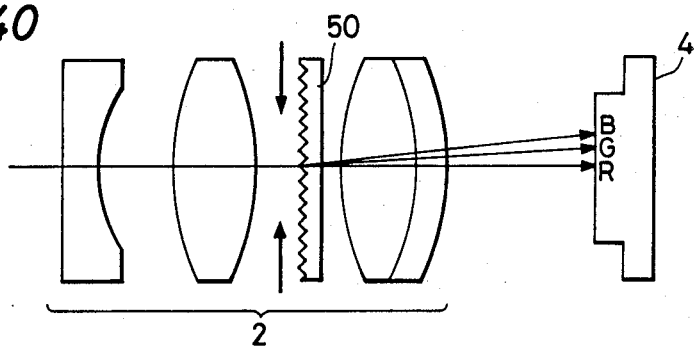
FIGS. 40 and 41 are illustrations showing the essential portions of mutually different further embodiments of the present invention.

FIG. 40 shows an embodiment which uses a diffraction grating of the transmission type. In this embodiment, a diffraction grating 50 is employed in the objective lens 2. In this instance, 0-order diffracted light remains. In case this light becomes an obstruct for image pickup, it is only necessary to use such a diffraction grating as having the property that the directions of advancement of the 0-order diffracted light and the primary diffracted light differ substantially relative to each other, and to have only the primary diffracted light received by the solid-state image sensor 4. By so arranging, the amount of light which arrives at the image sensor 4 will decrease by the amount of the 0-order diffracted light, and therefore, it is only necessary to increase the brightness of the illumination light for an amount corresponding to the reduced amount.

Figure 41:
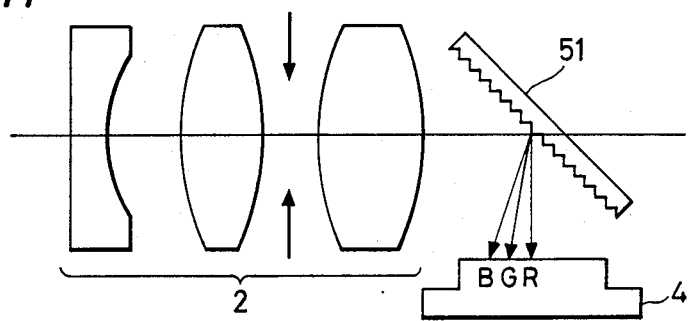

FIG. 41 shows an embodiment which uses a diffraction grating of the reflection type. In this instant embodiment, a diffraction grating 51 is disposed between the objective lens 2 and the solid-state image sensor 4. In this case, by disposing the diffraction grating 51 in Braze fashion, substantially all of the photo-energy can be concentrated to the 0-order diffraction light. Accordingly, by arranging so that the red color light R, green color light G and blue color light B which have been changed of their directions of advancement through diffraction will hit the solid-state image sensor 4, the loss of the amount of light becomes very much reduced.

In the above-described embodiment, it is possible to use either a zone plate or a hologram in place of the diffraction gratings 50 and 51.

Figure 42A:
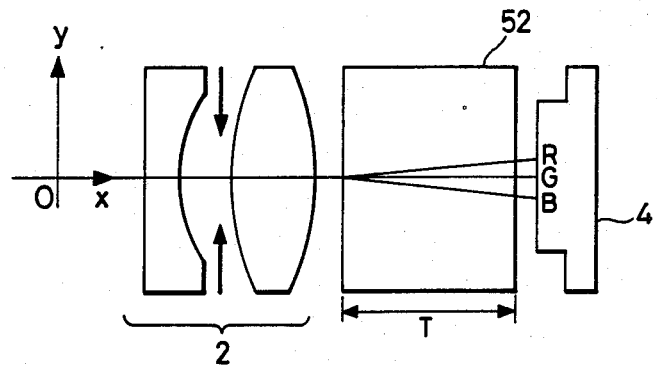
FIGS. 42A and 42B are illustrations showing the essential portion of still another embodiment of the present invention and the refraction characteristics, for the respective color lights, of the color-separating optical member employed in said essential portion.
Figure 42B:
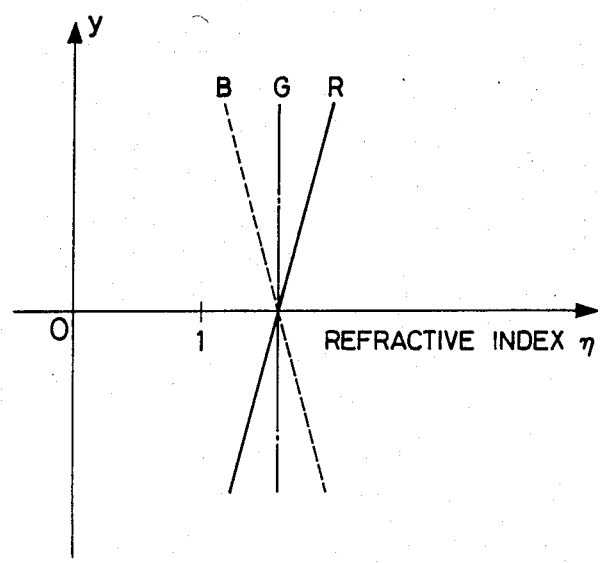

FIG. 42A shows an embodiment which is arranged so that a glass block 52 comprised of a medium of a heterogeneous substance is disposed between the objective lens 2 and the solid-state image sensor 4 to perform color dispersion. This glass block 52 is so designed that its internal refractive index distribution is of a pattern as shown in FIG. 42B, so that it can separate the incident light into three colors as shown in FIG. 42A. As shown in FIG. 42A, when y-axis is taken in a direction normal to the optical axis, it will be noted that the glass block 52 has an almost rectilinear distribution of refractive index for the wavelength of green color light G, the refractive index for this wavelength of green color light is uniform in the direction of y-axis, whereas for the wavelength of blue color light B, the glass block has a substantially rectilinear distribution of refractive index such that the refractive index coincides with the refractive index for the wavelength of green color light G on the optical axis and the refractive index progressively reduces as the position within the glass block goes farther away toward the direction of plus-y from the optical axis, while the refractive index increases progressively as the position departs farther away from the optical axis toward minus-y, and for the wavelength of red color light R, the block has a substantially rectilinear refractive index distribution such that the refractive index coincides with the refractive index for the wavelength of green color light G on the optical axis, while increasing progressively as the position departs more toward plus-y direction from the optical axis, and decreasing progressively as the position departs therefrom toward minus-y direction. Owing to such refractive index distribution pattern of the glass block 52 as mentioned above, it will be noted that, when the incident light emits from the glass block, the emitting light is deflected in such a way that red color light R and blue color light B will advance so as to part away from each other in the vertical direction, sandwiching green color light G therebetween in FIG. 41A. The purpose of the present invention can be achieved by disposing the solid-state image sensor 4 so that the abovesaid directions of separation of light rays will be the desired direction of image separation. The amount of separation at the focusing plane depends on the magnitude of inclination of the above-mentioned distribution rectilinear lines of the respective refractive indices and also on the thickness T of the glass block 52 in the direction of the optical axis. Here, attention must be paid to the fact that the refractive index distribution which has been explained based on FIG. 41B is not symmetrical relative to the optical axis.

In the respective embodiments described above, there are shown structures for separating the respective color lights from each other in a specific single direction except for the embodiment of FIG. 12A. Next, description will be made of an embodiment arranged so that the respective color lights are displaced in two directions which cross each other at right angles, i.e. horizontal direction and vertical direction, to thereby further enhance the resolving power.

Figure 43A:
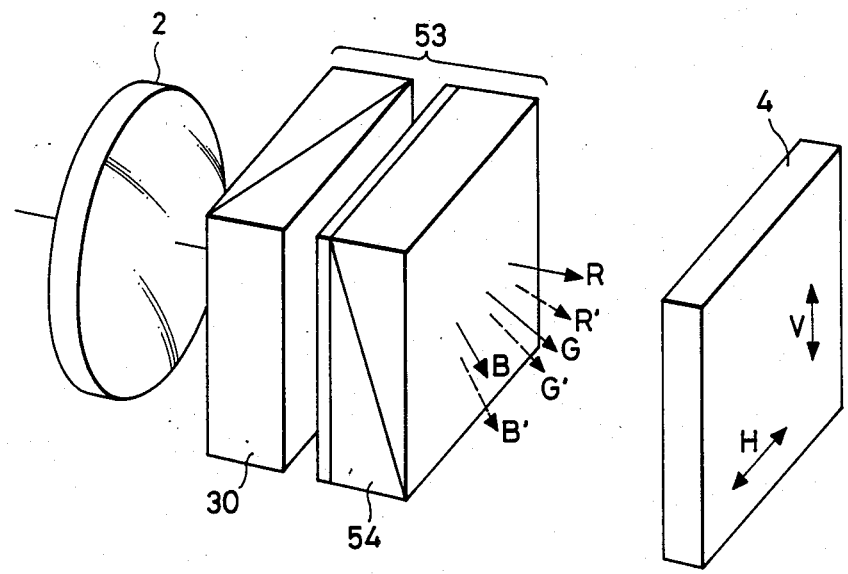
FIG. 43A is a perspective view showing the essential portion of yet another embodiment of the present invention.
Figure 43B:
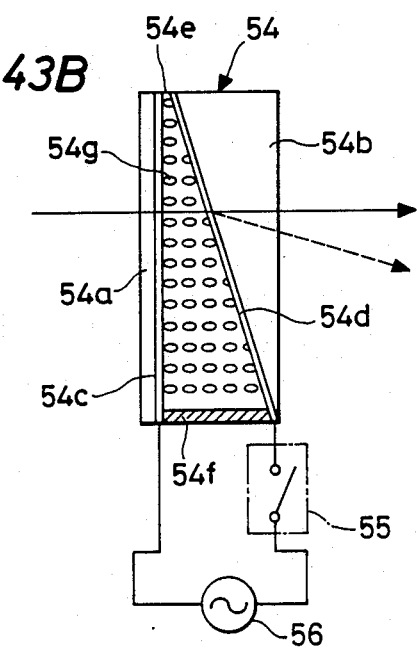
FIG. 43B is a sectional view showing the detailed structure of the color-separating optical member employed in FIG. 43A.

FIG. 43A shows an embodiment arranged so that a light divider 53 is disposed between the objective lens 2 and the solid-state image sensor 4 so that the light coming from the object under observation is focused by the objective lens 2 on the light-receiving plane of the solid-state image sensor 4 via the light-divider 53. In FIG. 43A, letters H and V represent the horizontal as well as vertical directions of scanning performed by the solid-state image sensor, respectively. The light divider 53 is comprised of an already-stated color dispersion prism 30 and a liquid crystal light deflector 54 as shown in FIG. 43B. The color dispersing prism 30 forms on the light-receiving surface of the solid-state image sensor 4, three images of red color light R, green color light G and blue color light B which are displaced from each other along the horizontal scanning direction H of the solid-state image sensor 4. The liquid crystal light deflector 54, on the other hand, is comprised, as shown in FIG. 43B, of a light deflection plate 54a, a prism 54b disposed to face said light deflection plate 54a so as to define a space of a triangular cross sectional shape between this prism 54b and said light deflection plate 54a, transparent electrodes 54c, 54d which are formed on the respective opposing inner surfaces of the light deflection plate 54a and the prism 54b, spacers 54e and 54f for securing said space, and a liquid crystal 54g enclosed in said space in the state of being oriented in the direction of the optical axis. Across these transparent electrodes 54c and 54d is intervened by an AC power supply 56 to which they are connected via a switch 55 which is opened and closed in synchronism with a vertical synchronizing signal supplied from an image processor. In this case, the direction of light-deflection is set so that the light which has passed through the light deflection plate 54a will become either ordinary light or extraordinary light (which, in FIG. 43B, the light will be rendered to ordinary light when the switch 55 is turned off). Also, the refractive index $\eta_0$ of the liquid crystal 54g for ordinary light is so selected as will be substantially equal to the refractive index $\eta_p$ of the prism 54b.

In this instant embodiment, it will be noted that, in the state of the switch 55 being "off", the liquid crystal light deflector 53 has no refracting function, so that the respective color lights R, G and B which have been so dispersed by the color dispersing prism 30 transmit directly through said deflector 53 to arrive at the surface of the solid-state image sensor 4. Contrary thereto, when the switch 55 is in the state of "on", the orientation of the liquid crystal molecules alters, so that the respective color lights which have transmitted through the light deflection plate 54a will be rendered extraordinary lights to the liquid crystal. For this reason, the refractive index of the liquid crystal 54g will change to the refractive index $\eta_e$ for abnormal light (ordinarily, $\eta_o < \eta_e$). Whereby, the light incident to the liquid crystal light deflector 54 will refract as shown by the broken line in FIG. 43B. Accordingly, the respective color lights emitting from the light divider 53 will arrive at the solid-state image sensor 4 while somewhat displaced in the vertical scanning direction as shown by R', G' and B' in FIG. 43A. The switch 55 is turned on and off in synchronism with the vertical synchronizing signals, so that it is possible to obtain image signals which are displaced in the vertical direction for every 1 (one) field. As such, by setting the amounts of horizontal as well as vertical directional displacement of the images of the respective color lights R, G and B at an appropriate value, respectively, such as ½, ⅓, ¼, etc. of the repetitive pitch of a color-encoding filter provided on the solid-state image sensor or in the foreground thereof, it is possible to enhance the resolving power in both the horizontal as well as vertical directions.

Figure 44:
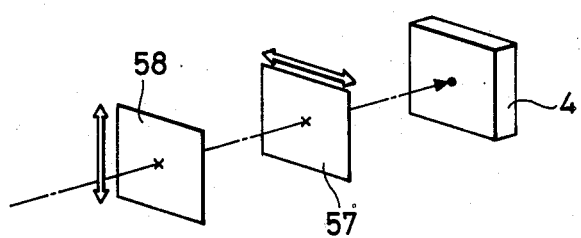
FIGS. 44 and 45 are illustrations showing mutually different structural principles of image displacement for the respective color lights.
Figure 45:
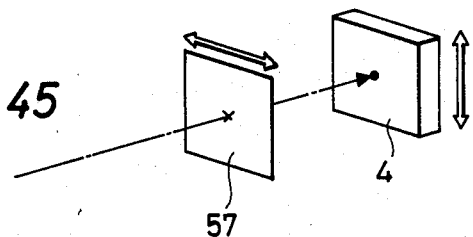
Figure 46:
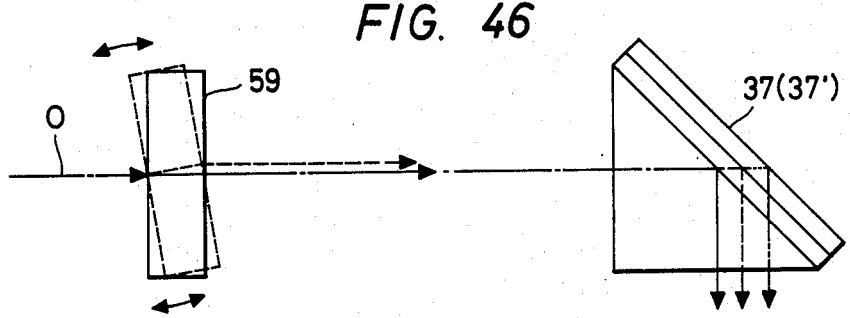
FIGS. 46, 47A and 47B are illustrations showing mutually different two examples, respectively, for realizing the principle of FIG. 44.
Figure 47A:
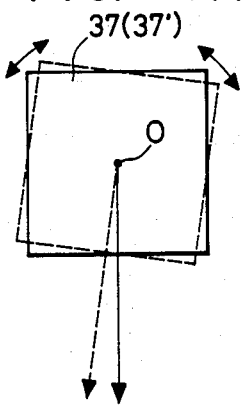
Figure 47B:
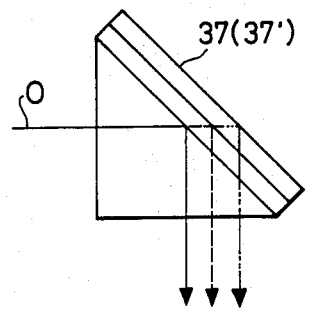
Figure 48A:
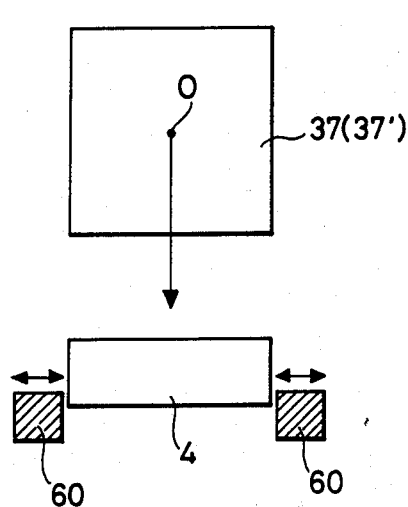
FIGS. 48A and 48B, 49A and 49B are illustrations showing mutually different two examples, respectively, for realizing the principle of FIG. 45.
Figure 48B:
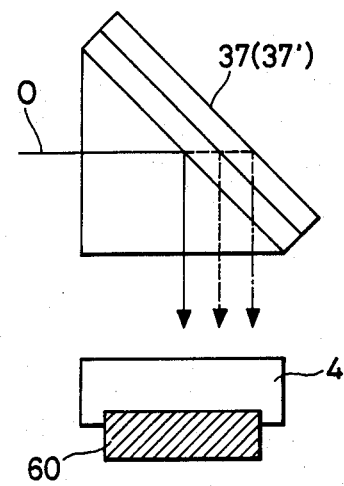
Figure 49A:
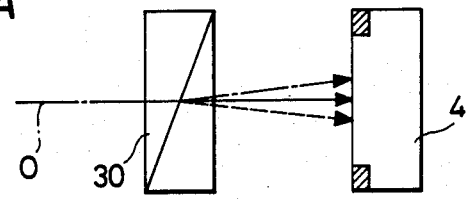
Figure 49B:
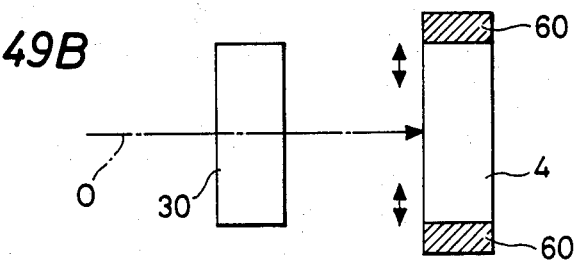

Furthermore, FIGS. 44 and 45 show structures, in term of principle, of mutually different embodiments arranged so as to normally cause color dispersion in the horizontal scanning direction, whereas in the vertical direction to displace the picture elements in synchronism with the vertical synchronizing signal per frame unit or field unit, thereby enhancing the resolving power in the vertical direction also. More particularly, FIG. 44 shows the structure arranged so that, in the foreground of the solid-state image sensor 4, there are disposed, in successive order, means 57 for causing color dispersion in the horizontal direction and means 58 for displacing picture elements in the vertical direction. In FIG. 45, there is shown the structure arranged so that means for displacing picture elements in the vertical direction is added to the solid-state image sensor 4, and that in its foreground there is disposed means 57 for causing color dispersion in the horizontal direction. Here, it should be noted that, as the abovesaid means 57, there can be utilized already-described various types of optical devices such as the prism 37 or 37', and as said means 58, there can be adopted the method, as shown in FIG. 46, that the parallel plate 59 which develops little dispersion is pivoted in the direction of arrow so as to intersect the optical axis 0 obliquely. In such an instance, the result obtained will be that no color dispersion is performed in the vertical direction, and the picture elements due to white color light are displaced in the vertical direction. The amount of this displacement is either ½ or ¼ of the interval between picture elements. FIGS. 47A and 47B show an embodiment arranged so that the abovesaid prism 37 or 37' is provided for pivotal movement in the direction of arrow about the optical axis 0, to thereby function so that the functions of abovesaid means 57 and 58 are concurrently served by a single optical device. FIGS. 48A and 48B show an embodiment based on the structure shown in FIG. 45, so that, as the abovesaid means 57, the already-described prism 37 or 37' is utilized, and a piezoelectric device 60 is used to vertically move the solid-state image sensor 4 for a distance of, for example, ½ of the interpicture-element interval. FIGS. 49A and 49B show another embodiment based on the structure shown in FIG. 44. As the abovesaid means 57, the already-described color dispersing prism 30 is utilized, and a piezoelectric device 60 is utilized also to vertically move the solid-state image sensor 4 for a distance of, for example, ½ of the inter-picture-element interval. In case the piezoelectric device 60 is utilized, the solid-state image sensor 4 is attached to the piezoelectric device 60, and a driving voltage which is synchronous with the vertical synchronizing signal is applied to this piezoelectric device 60, to thereby deform the piezoelectric device 60, whereby to pivot the solid-state image sensor 4 in synchronism with either the field or the frame.

What is claimed is:

1. A high resolution image pickup system with color dispersion means comprising:

illuminating means capable of sequentially irradiating at least three kinds of color lights different from each other in wavelength onto an object under observation;

an objective lens system forming images of said object with said color lights coming from said object irradiated by said illuminating means;

a single solid-state image sensor provided with a plurality of picture elements regularly arrayed on a light-receiving surface thereof and receiving said object images formed, by said objective lens system; and signal processing means connected to said image sensor for producing an image signal representing a color image of said object based on a photo-electric signal supplied from said image sensor, wherein:

color dispersion means is provided to be disposed in an optical path through which respective color lights coming from said object reach said image sensor and to receive and separately emanate said three kinds of color lights entering through the same path so that they are incident on different positions of said image sensor in accordance with their wavelengths;

said object images with said respective color lights are formed at positions different from each other on the light receiving surface of said solid-state image sensor through said objective lens system and said color dispersion means;

a compound image signal representing said object is produced in said signal processing means by superposing said image signals of said respective color lights obtained on the basis of said photoelectric signals supplied from said image sensor in response to each of said object images with said respective color lights; and a color object image is represented observably by supplying said compound image signal to display means.

2. A high resolution image pickup system according to claim 1, in which:

said color dispersion means comprises a color-dispersing prism arranged on an optical axis of said objective lens system and capable of refracting incident lights at different angles in accordance with their wavelengths before emission of the lights.

3. A high resolution image pickup system according to claim 2, in which:

said three kinds of color lights different from each other in wavelength are red, green and blue color lights; and displacement of relative positions of an image formed by said green color light and of an image formed by said blue color light relative to an image formed by said red color light, of the object images with said respective color lights which are formed at positions different from each other on the light-receiving surface, is ½ pitch and 1 pitch of an interval between picture elements adjacent to each other, of said plurality of picture elements.

4. A high resolution image pickup system according to claim 2, in which:
a plurality of color dispersing prisms are provided in line in a direction in which light travels and are disposed so that plane surfaces formed by incident and emanating lights of respective color dispersing prisms intersect with each other.

5. A high resolution image pickup system according to claim 4, in which:
said three kinds of color lights different from each other in wavelength are red, green and blue color lights;
said color dispersion means is comprised of adjacently disposed first and second color dispersing prisms,
said second color dispersing prism is comprised of a third and a fourth prism which are bonded together;
said first color dispersing prism is comprised of a first and a second prism which are bonded together;
said first and second prisms have an equal refractive index for green color light and red color light but have mutually different refractive indices for blue color light; and
said third and fourth prisms have an equal refractive index for blue color light and green color light but have mutually different refractive indices for red color light.

* * * * *